(12) United States Patent
Kitamura et al.

(10) Patent No.: US 8,291,162 B2
(45) Date of Patent: *Oct. 16, 2012

(54) STORAGE SYSTEM

(75) Inventors: Manabu Kitamura, Kawasaki (JP);
Junji Ogawa, Sagamihara (JP); Shunji Kawamura, Yokohama (JP); Takao Sato, Odawara (JP); Naoto Matsunami, Hayama (JP); Shintaro Ito, Yokohama (JP); Tomohiro Yoshihara, Kawasaki (JP); Takuji Ogawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/234,507

(22) Filed: Sep. 16, 2011

(65) Prior Publication Data

US 2012/0011396 A1    Jan. 12, 2012

Related U.S. Application Data

(63) Continuation of application No. 12/026,858, filed on Feb. 6, 2008, now Pat. No. 8,037,245.

(30) Foreign Application Priority Data

Oct. 18, 2007    (JP) ................................. 2007-270902

(51) Int. Cl.
*G06F 12/16* (2006.01)
*H03M 13/11* (2006.01)
(52) U.S. Cl. .......................... 711/114; 714/6.2; 714/758
(58) Field of Classification Search ........................ None
See application file for complete search history.

(56) References Cited

U.S. PATENT DOCUMENTS

| | | | |
|---|---|---|---|
| 5,537,534 A | 7/1996 | Voigt et al. | |
| 5,860,090 A | 1/1999 | Clark | |
| 5,862,158 A | 1/1999 | Baylor et al. | |
| 6,055,646 A | 4/2000 | Uchihori et al. | |
| 6,675,318 B1 | 1/2004 | Lee | |
| 6,871,263 B2 | 3/2005 | Dandrea | |
| 7,512,862 B1* | 3/2009 | Taylor | 714/755 |
| 2003/0070043 A1 | 4/2003 | Merkey | |
| 2005/0166083 A1 | 7/2005 | Frey et al. | |
| 2006/0129873 A1 | 6/2006 | Hafner | |
| 2007/0198890 A1* | 8/2007 | Dholakia et al. | 714/758 |
| 2008/0168225 A1 | 7/2008 | O'Connor | |
| 2009/0106492 A1* | 4/2009 | Muto et al. | 711/114 |
| 2009/0144497 A1 | 6/2009 | Withers | |

OTHER PUBLICATIONS

Extended European Search Report in European Patent Application 08250801.1 mailed Mar. 30, 2011.
"Intelligent RAID 6 Theory Overview and Implementation" 2005.

* cited by examiner

*Primary Examiner* — Kaushikkumar Patel
(74) *Attorney, Agent, or Firm* — Brundidge & Stanger, P.C.

(57) ABSTRACT

One code (a compressed redundant code) is created based on a plurality of first redundant codes, each created on the basis of a plurality of data units, and this compressed redundant code is written to a nonvolatile storage area. This compressed redundant code is used to restore either a data element constituting a multiple-failure data, or a first redundant code corresponding to the multiple-failure data, which is stored in an unreadable sub-storage area of a partially failed storage device, and to restore the data element constituting the multiple-failure data which is stored in a sub-storage area of a completely failed storage device, based on the restored either data element or first redundant code, and either another data element constituting the multiple-failure data or the first redundant code corresponding to the multiple-failure data.

14 Claims, 22 Drawing Sheets

FIG. 4

RAID CONFIGURATION TABLE 400

| VDEV | Disk | RAID level | Stripe size |
|---|---|---|---|
| 0 | 0,1,2,3,4,5,6,7 | 0xb | 32KB |
| 1 | 8,9,10,11 | 0xa | 32KB |
| 2 | 12,13,14,15,16,17,18,19 | 0xa | 32KB |
| ⋮ | ⋮ | ⋮ | ⋮ |
| k | m,m+1 | 5 | 32KB |

VDEV CONFIGURATION TABLE 500

| VDEV (501) | LDEV (502) | Start (503) | End (504) |
|---|---|---|---|
| 0 | 0 | 0 | 0x77FFFFF |
| 0 | 1 | 0x7800000 | 0xC7FFFFF |
| ⋮ | ⋮ | ⋮ | ⋮ |
| 1 | 11 | 0 | 0x77FFFFF |
| 1 | 12 | 0x7800000 | 0xEFFFFFF |
| 1 | 13 | 0xF000000 | 0x13FFFFFF |
| ⋮ | ⋮ | ⋮ | ⋮ |

FIG. 6

LU CONFIGURATION TABLE 600

| LDEV | WWN | LUN | Capacity |
|---|---|---|---|
| 0 | 31:02:c2:60:35:01 | 0 | 0x0057300 |
| 1 | 31:02:c2:60:35:01 | 1 | 0x01BBC000 |
|   | 31:02:c2:26:44:04 | 2 |   |
| ⋮ | ⋮ | ⋮ | ⋮ |
| k | 31:02:c2:26:44:04 | n | 0x1ADB0000 |

HDD FAILURE-CHECK TABLE 700

| Disk (701) | error (702) |
|---|---|
| 0 | 0 |
| 1 | 1 |
| ⋮ | ⋮ |
| N | 0 |

FIG. 8

STRIPE FAILURE-CHECK TABLE 800

| Stripe (801) | error (802) |
|---|---|
| 0 | 0 |
| 1 | 0 |
| 2 | 1 |
| ⋮ | ⋮ |
| s | 0 |

EXAMPLE OF DISK SECTOR LAYOUT

STORAGE SYSTEM

CROSS-REFERENCE TO PRIOR APPLICATION

This application relates to and claims the benefit of priority from Japanese Patent Application number 2007-270902, filed on Oct. 18, 2007 and is a continuation application of U.S. application Ser. No. 12/026,858, filed Feb. 6, 2008 now U.S. Pat. No. 8,037,245, the entire disclosures of which are incorporated herein by reference.

BACKGROUND

The present invention generally relates to a storage system, and more particularly to the restoration of a data element.

A storage system, in which technology called RAID (Redundant Arrays of Independent (or Inexpensive) Disks) is applied, generally comprises a RAID Group made up of a plurality of storage devices. The RAID Group storage area is constituted from a plurality of rows of sub-storage areas. The respective rows of sub-storage areas span the plurality of storage devices that make up the RAID Group, and are made up of a plurality of sub-storage areas corresponding to the plurality of storage devices. Hereinafter, one sub-storage area will be called a "stripe", and one row, which is constituted by a plurality of stripes, will be called a "row of stripes". The RAID Group storage area is made up of consecutive rows of stripes.

A RAID is known to have a number of levels (referred to as "RAID levels" hereinafter).

For example, there is RAID 5. In RAID 5, data is distributively written to a plurality of storage devices (for example, hard disk drives (HDDs)) constituting a RAID Group, which corresponds to RAID 5. More specifically, for example, data to be written specified by a host computer is divided into data of prescribed sizes (for the sake of convenience, referred to as "data units" hereinafter), the respective data units are divided into a plurality of data elements, and the plurality of data elements is written to a plurality of stripes. Further, in RAID 5, to restore a data element which cannot be read from a storage device as the result of a failure having occurred in this storage device, redundant information called "parity" (hereinafter "redundant code") is created for a single data element, and this redundant code is also written to a stripe. More specifically, for example, when a RAID Group is constituted by four storage devices, three data elements, which constitute a data unit, are written to three stripes corresponding to three of these storage devices, and the redundant code is written to the stripe corresponding to the remaining one storage device. If a failure should occur in one of the four storage devices which constitute the RAID Group, the unreadable data element is restored by using the remaining two data elements which constitute the data unit comprising this unreadable data element, and the redundant code corresponding to this data unit.

One problem in RAID 5 is that it cannot tolerate so-called double-failures. More specifically, when it is not possible to read out two data elements of a plurality of data elements constituting a data unit due to the fact that two storage devices of a plurality of storage devices constituting a RAID Group have failed, these two data elements cannot be restored. This is because there is only one redundant code created for each data unit.

RAID 6 is the RAID level that is capable of tolerating a double-failure like the above. In RAID 6, two (two types) of redundant codes are created in each row of stripes (Refer to Intelligent RAID 6 Theory Overview and Implementation (http://www.intel.com/desing/storage/papers/308122.htm, http://www.intel.com/design/storage/intelligent_raid.htm)).

However, although RAID 6 is advantageous in that it is capable of tolerating a double-failure, it is disadvantageous in that it requires more storage capacity than RAID 5 for a single data unit. This is because more redundant codes are written for a data unit than in RAID 5.

SUMMARY

Accordingly, an object of the present invention is to make it possible both to restore two or more unreadable data elements in a single data unit, and to conserve consumed storage capacity.

The present invention, based on a plurality of first redundant codes, which is created on the basis of a plurality of data units, creates a compressed redundant code, which is one code the size of which is smaller than the total size of this plurality of first redundant codes, and writes this compressed redundant code to a nonvolatile storage area. Using this compressed redundant code, the present invention restores either a first data element which constitutes a multiple-failure data, or a first redundant code which corresponds to the multiple-failure data, and restores a second data element which constitutes the multiple-failure data, on the basis of the restored either first data element or first redundant code, and either another data element which constitutes the multiple-failure data, or a first redundant code which corresponds to the multiple-failure data.

BRIEF DESCRIPTION OF THE DRAWINGS

FIG. 4 is a diagram showing an example of the constitution of a RAID configuration table;

FIG. 5 is a diagram showing an example of the constitution of a VDEV configuration table;

FIG. 6 is a diagram showing an example of the constitution of a LU configuration table;

FIG. 7 is a diagram showing an example of the constitution of an HDD failure-check table;

FIG. 8 is a diagram showing an example of the constitution of a stripe failure-check table;

DETAILED DESCRIPTION OF THE PREFERRED EMBODIMENT

Figure 1:
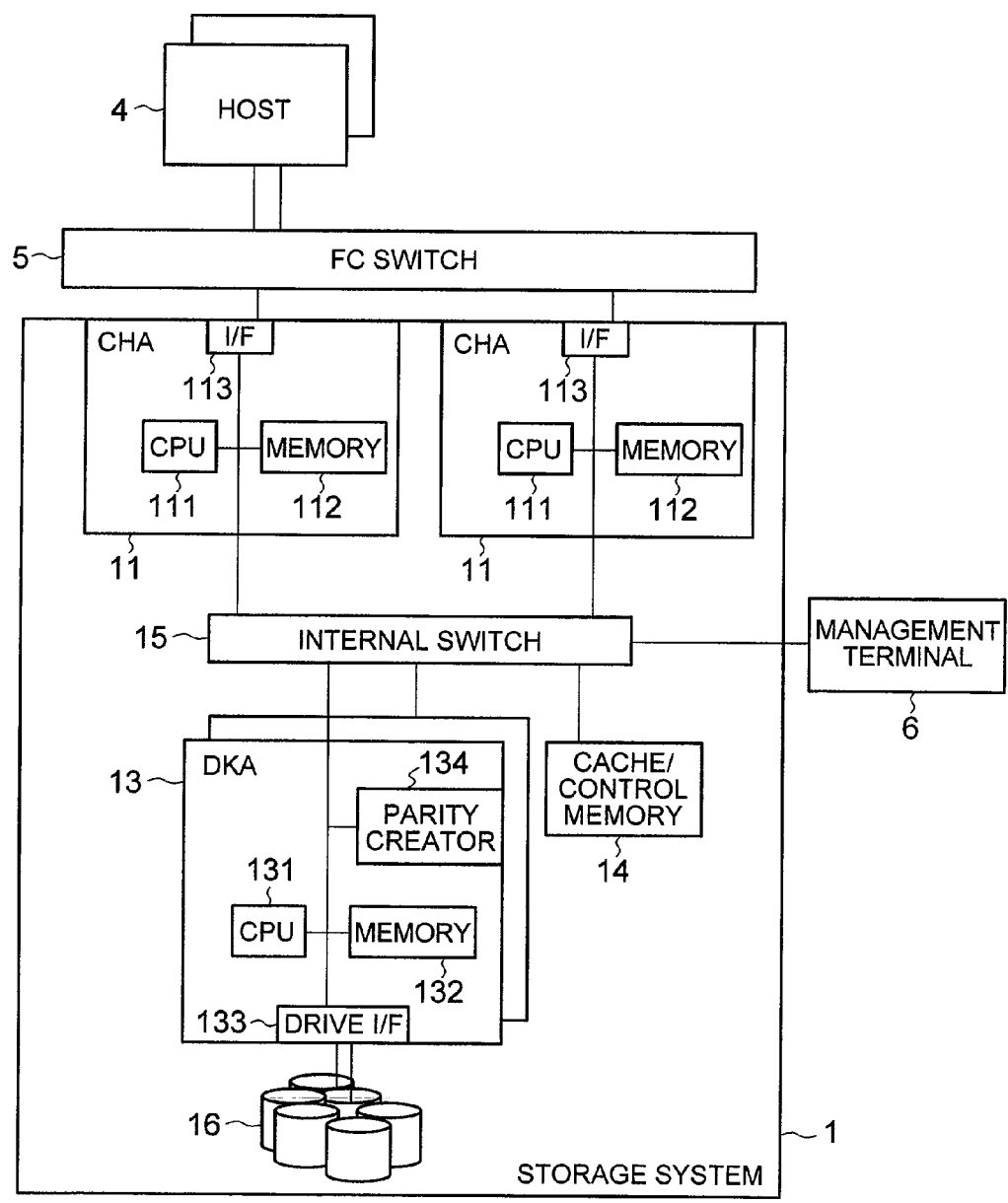
FIG. 1 is a diagram showing the physical constitution of a storage system related to an embodiment of the present invention.

In a first embodiment, a storage system comprises a storage group constituted by a plurality of storage devices; a write controlling portion for dividing write-targeted data into data units, which are data of prescribed sizes, and writing these data units to the storage group; and a restore controlling portion for restoring a data element constituting a data unit stored in the storage group. The write controlling portion and restore controlling portion, for example, are provided in a storage system controller. A group storage area, which is the storage area of the storage group, is constituted by a plurality of rows of sub-storage areas (for example, rows of stripes). The respective rows of sub-storage areas are constituted by pluralities of sub-storage areas (for example, stripes), which span the plurality of storage devices, and correspond to the plurality of storage devices. A sub-storage area in one of the rows of sub-storage areas, for example, corresponds one-to-one with a storage device. The size of a data unit is smaller than the size of one row of sub-storage areas.

The write controlling portion (W1) respectively writes a plurality of data elements constituting a data unit to a different sub-storage area corresponding to a different storage device, (W2) creates, based on a plurality of first redundant codes which are created on the basis of a plurality of data units, a compressed redundant code whose size is smaller than the total size of the above-mentioned plurality of first redundant codes, and (W3) writes the above-mentioned created compressed redundant code to a nonvolatile storage area (for example, a nonvolatile memory, or a specific sub-storage area, which constitutes a specific row of sub-storage areas other than the row of sub-storage areas to which the data element is written).

A completely failed storage device from which a data element cannot be read out from any of the sub-storage areas, and a partially failed storage device having both a sub-storage area from which a data element can be read out and a sub-storage area from which a data element cannot be read out, may exist in one storage group, hence, when multiple-failure data, which is a data unit comprising at least two unreadable data elements, exists, the restore controlling portion (R1) reads the compressed redundant code from the nonvolatile storage area (for example, the above-mentioned specific sub-storage area), and uses the above-mentioned compressed redundant code to restore either the data element constituting the multiple-failure data or the first redundant code corresponding to the multiple-failure data, which is stored in the unreadable sub-storage area of the partially failed storage device, and (R2) restores the data element constituting the multiple-failure data, which is stored in a sub-storage area of the completely failed storage device, based on the restored either data element or first redundant code, and either another data element constituting the multiple-failure data or the first redundant code corresponding to the multiple-failure data.

The above-mentioned storage device, for example, can be a hard disk drive, flash memory drive, or any of various other types of storage media drives.

In a second embodiment according to the first embodiment, as the above-mentioned (W1), the write controlling portion creates a first redundant code on the basis of the plurality of data elements constituting the above-mentioned data unit, and respectively writes the above-mentioned plurality of data elements and first redundant code to a different sub-storage area corresponding to a different storage device, and as the above-mentioned (W2), creates the above-mentioned compressed redundant code based on no less than two data elements and no less than two first redundant codes, which are written to a plurality of sub-storage areas constituting the storage system. As the above-mentioned (W3), the write controlling portion can write the respective compressed redundant codes to the respective specific sub-storage areas of the respective storage devices.

In this second embodiment, as the above-mentioned (R1), the restore controlling portion reads the compressed redundant code corresponding to the partially failed storage device (for example, reads out the compressed redundant code from the specific sub-storage area of the partially failed storage device), reads out a data element and a first redundant code from a prescribed range of readable sub-storage areas from among the plurality of sub-storage areas constituting the partially failed storage device, and restores either the data element constituting the multiple-failure data or the first redundant code corresponding to the multiple-failure data, which is stored in an unreadable sub-storage area, on the basis of the read-out compressed redundant code, data element, and first redundant code, and as the above-mentioned (R2), restores either the data element constituting the multiple-failure data or the first redundant code corresponding to the multiple-failure data, which is stored in a sub-storage area of the completely failed storage device, based on the restored either data element or first redundant code, and either the other data element constituting the multiple-failure data or the first redundant code corresponding to the multiple-failure data.

In a third embodiment, the storage system further comprises a cache memory for storing the respective compressed redundant codes corresponding to the respective storage devices. Each time the write controlling portion carries out the above-mentioned (W1), the write controlling portion updates the respective compressed redundant codes stored in the cache memory in the above-mentioned (W2), and subsequent to updating the compressed redundant codes a plurality of times, in the above-mentioned (W3), writes the post-update compressed redundant codes stored in the cache memory to nonvolatile storage areas (for example, the specific sub-storage areas of the storage devices corresponding to the post-update compressed redundant codes).

In a fourth embodiment according to any of the first through the third embodiments, as the above-mentioned (W1), the write controlling portion creates a second redundant code based on the plurality of data elements constituting the data unit, and respectively writes the plurality of data elements and the second redundant code to the different sub-storage areas each of which is in a different storage device, as the above-mentioned (W2), creates a plurality of first redundant codes respectively corresponding to a plurality of data units, and creates a compressed redundant code based on the plurality of first redundant codes for each plurality of data units written to the storage group, and as the above mentioned (W3), writes the respective compressed redundant codes corresponding to each plurality of data units written to the storage group to nonvolatile storage areas (for example, the specific sub-storage areas in the storage devices).

In this fourth embodiment, the restore controlling portion (R3) restores a data element constituting a single-failure data, which is a data unit that is not multiple-failure data, stored in a sub-storage area of the completely failed storage device, based on the other data element constituting the single-failure data and the second redundant code corresponding to the single-failure data, as the above-mentioned (R1), creates a first redundant code based on the single-failure data having the restored data element, reads the compressed redundant code corresponding to the plurality of data units, one member of which is the single-failure data, and restores the first redundant code corresponding to the multiple-failure data comprising the data element stored in the unreadable storage area of the partially failed storage device, based on the first redundant code corresponding to the single-failure data and the read-out compressed redundant code, and as the above-mentioned (R2), restores the data elements constituting the multiple-failure data, which are respectively stored in a sub-storage area of the completely failed storage device and the unreadable sub-storage area of the partially failed storage device, based on the above-mentioned restored first redundant code corresponding to the multiple-failure data, the second redundant code corresponding to the multiple-failure data, and the other data element constituting the multiple-failure data.

In a fifth embodiment according to the fourth embodiment, for a plurality of data units corresponding to one compressed redundant code, between a first group of sub-storage areas which is a plurality of sub-storage areas where a data unit is stored, and a second group of sub-storage areas which is a plurality of sub-storage areas where the subsequent data unit is stored, there is at least one different group of sub-storage areas in which is stored a data unit, of a plurality of data units corresponding to at least one different compressed redundant code.

In a sixth embodiment according to the fifth embodiment, the number of different groups of sub-storage areas existing between the first group of sub-storage areas and the second group of sub-storage areas is a number based on storage media of the respective storage devices constituting the storage group.

In a seventh embodiment according to any of the fourth through the sixth embodiments, the compressed redundant code is written to a specific sub-storage area of a storage device that differs from the storage device for storing the respective second redundant codes, which correspond to the respective data units corresponding to the compressed redundant code.

In an eighth embodiment according to the seventh embodiment, one row of sub-storage areas is larger in size than the total size of one data unit and one second redundant code.

Two or more arbitrary embodiments of the above-described first through eighth embodiments can be combined. At least one of the above-described write controlling portion and restore controlling portion can be constituted by hardware (for example, a circuit), a computer program, or a combination of these (for example, a portion thereof can be realized by a computer program, and the remainder thereof can be realized by hardware). The computer program is read into and executed by a prescribed processor. Further, a storage region existing in a memory or other such hardware resource can be used as needed when information processing is carried out by reading the computer program into the processor. Further, the computer program can be installed in the computer from a CD-ROM or other such recording medium, or the computer program can be downloaded to the computer via a communication network.

An embodiment of the present invention will be explained in detail hereinbelow while referring to the figures. Furthermore, in the following explanation, respective data of a prescribed size, which is required for creating a redundant code, will be referred to as a "data unit", and data, which is a component element of a data unit, and which is stored in one stripe, will be referred to as a "data element". Further, in the following explanation, the storage group is called a "RAID Group", and it is supposed that the respective storage devices constituting the RAID Group are HDD (hard disk drives).

FIG. 1 is a diagram showing the physical constitution of a storage system 1 related to an embodiment of the present invention.

One or more host computers (hereinafter, host) 4 and the storage system 1 are connected via an FC (Fibre Channel) switch 5. In this figure, the host 4 and storage system 1 are connected via one FC switch 5, but can also be connected via a plurality of FC switches 5. Furthermore, a SAN (Storage Area Network) is constructed from one or more FC switches 5. The FC switch 5 and host 4, and the FC switch 5 and the storage system 1 are respectively connected by Fibre Channel cables. The host 4 can send a data I/O request (for example, a read request or a write request) to the storage system 1 by way of the FC switch 5.

The storage system 1, for example, can be a RAID system comprising a plurality of HDDs 16 arranged in an array. The controller of the storage system 1, for example, is composed of a CHA (channel adapter) 11, DKA (disk adapter) 13, cache/control memory 14, and internal switch 15. Access to the storage system 1 from the host 4 is controlled by the controller. Furthermore, for example, the functions of the CHA 11, DKA 13 and internal switch 15 can be built into the FC switch 5, and the storage system 1 can be realized by combining the FC switch 5 and the plurality of HDD 16.

The CHA 11 has one or a plurality of I/Fs (for example, a communication port, or a communication control circuit comprising a communication port) 113 communicably connected to an external device (for example, the host or the other storage system), and carries out data communications between the storage system and the external device. The CHA 11 is constituted as a microcomputer system (for example, a circuit board) comprising a CPU 111 and a memory 112. When there is a write request from the host 4, the CHA 11, for example, writes data to be written to the cache area of the cache/control memory 14. Further, when there is a read request from the host 4, the CHA 11 sends data to be read, which the DKA 13 read out from an HDD 16 and wrote to the cache area of the cache/control memory 14, to the host 4.

The DKA 13 has one or a plurality of drive I/Fs (for example, a communication port or communication control circuit comprising a communication port) 133 communicably connected to the respective HDDs 16, and carries out data communications with the HDD 16. The DKA 13 is constituted as a microcomputer system (for example, a circuit board) comprising a CPU 131 and a memory 132. The DKA 13, for example, writes to an HDD 16 data written to the cache area of the cache/control memory 14 from the CHA 11, and stores to the cache area data read from an HDD 16.

Further, the DKA 13 comprises a parity creator 134 for creating redundant codes (hereinafter, parity) for restoring data elements, which have become unreadable due to a failure in an HDD. In this embodiment, the parity creator 134 is a hardware circuit for creating parity, but can also be a function incorporated into a computer program. The parity creator 134, for example, creates parity by computing the exclusive OR of a plurality of data elements constituting a data unit (or by computing the exclusive OR of respective data subsequent to applying a prescribed coefficient to a plurality of data elements constituting a data unit). Further, the parity creator 134 creates one parity based on a plurality of parities (called a "compressed parity" hereinafter). In this embodiment, there is a first and a second data protection mode, and the method for creating a compressed parity will differ according to the data protection mode. In the first data protection mode, one compressed parity is created for each HDD. More specifically, one compressed parity is created based on a plurality of data elements and a plurality of first parities (hereinafter, P parities) stored in a plurality of stripes constituting an HDD for each HDD. In the second data protection mode, one compressed parity is created based on a plurality of P parities corresponding to a plurality of data units. That is, in the first data protection mode, the compressed parity is created based on data elements constituting a data unit as well as no less than two P parities, and in a second data protection mode, the compressed parity is created based solely on a plurality of P parities.

The cache/control memory 14, for example, is either a volatile or nonvolatile memory. The cache/control memory 14 is a memory having a cache area and a control area. The cache/control memory 14 can be made up of two memories, a memory having a cache area and a memory having a control area. Data received from an external device (the host 4) and data read out from an HDD 16 are temporarily stored in the cache area. Information related to the control of the storage system 1 (hereinafter, control information) is stored in the control area. Control information, for example, includes a variety of tables, which will be explained hereinbelow.

The internal switch 15, for example, is a crossbar switch, and interconnects the CHA 11, DKA 13, and cache/control memory 14. A bus or other type of connector can be used instead of the internal switch 15.

Further for example, a management terminal 6 is connected to the internal switch 15. The management terminal 6 is a computer for managing the storage system 1. The management terminal 6, for example, can store a variety of tables, which will be explained hereinbelow, in the control area of the cache/control memory 14. Furthermore, the functions carried out by the management terminal 6 can be built into the host 4. That is, the various tables explained hereinbelow can be stored from the host 4.

The preceding is an explanation of an example of the physical constitution of the storage system related to this embodiment. Furthermore, the above explanation is an example, and does not purport to limit the constitution of this storage system. For example, the controller can be a simpler constitution, for example, which comprises a CPU and memory on a single circuit board (a constitution in which the CHA 11 and DKA 13 functions are realized by a single circuit board).

Figure 2:
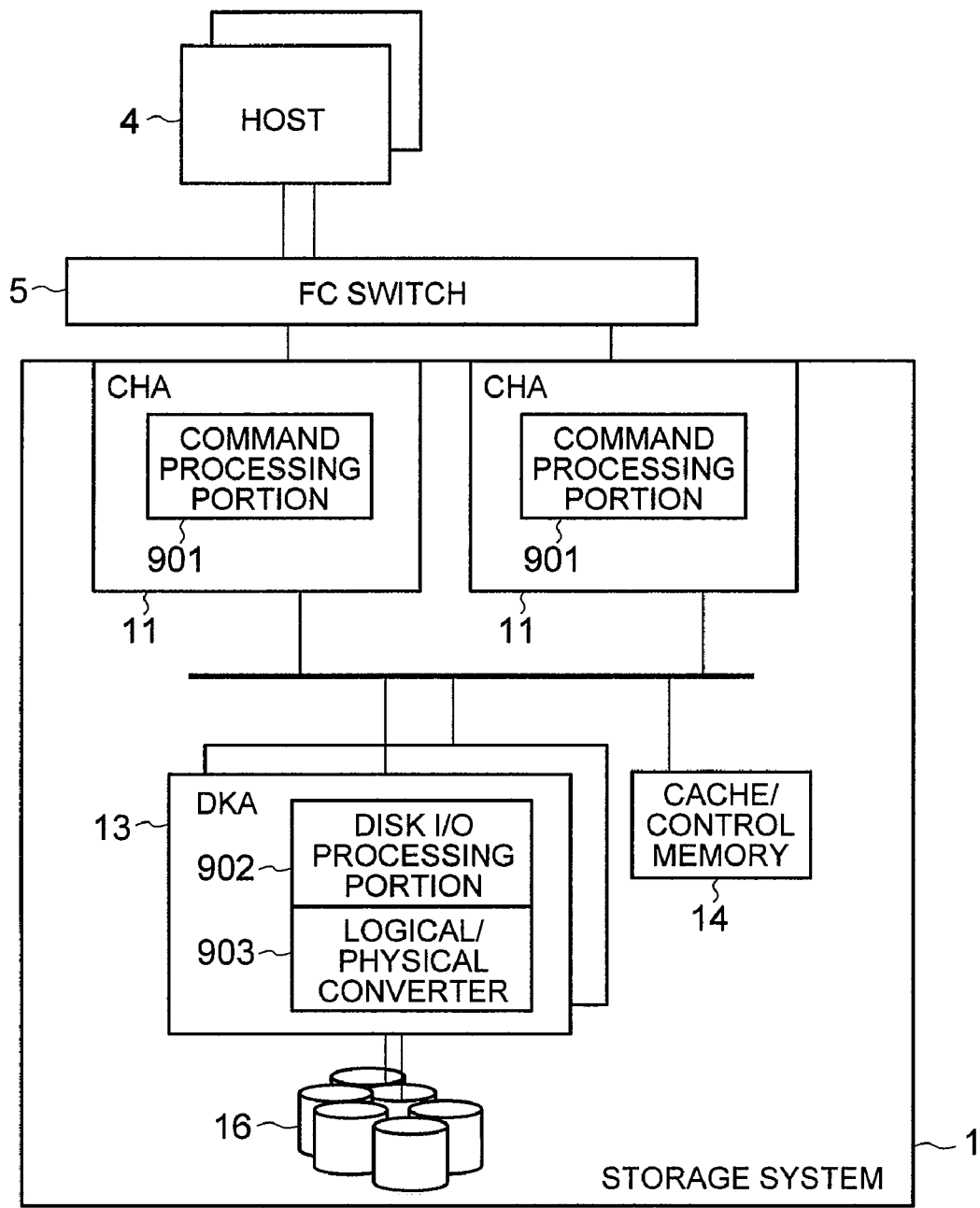
FIG. 2 is a diagram showing an example of the logical configuration of the storage system 1 related to this embodiment.

FIG. 2 is a diagram showing an example of the logical configuration of the storage system 1 related to this embodiment.

In the CHA 11, for example, a command processing portion 901, for example, is stored in the memory 112 as a computer program to be executed by the CPU 111. In the DKA 13, for example, a disk I/O processing portion 902 and a logical/physical converter 903, for example, are stored in the memory 132 as computer programs to be executed by the CPU 131. Hereinafter, whenever a computer program is the subject of a descriptive text, this will signify that the processing is actually being carried out by the CPU which executes this computer program.

Command processing portion 901 and/or I/O processing portion 902 can be executed by a or more micro processors.

The command processing portion 901 processes an I/O request received from the host 4. For example, when an I/O request is a write request, the command processing portion 901 writes data accompanying this write request to the cache area.

The logical/physical converter 903 converts a logical address to a physical address. A logical address, for example, is a LDEV identifier or the LBA (Logical Block Address) in this LDEV. A physical address is an LBA used for specifying the location of the respective disk blocks inside an HDD 16, or a "combination of a cylinder number, head number and sector number (CC, HH, SS)".

The disk I/O processing portion 902 controls the input/output of data to/from the HDD 16. More specifically, for example, the disk I/O processing portion 902 divides write data stored in the cache area into a plurality of data units, and writes the respective data units to the RAID Group. At this time, the disk I/O processing portion 902 uses the logical/physical converter 903 to convert the logical address of the access destination to a physical address, and sends I/O requests to HDDs 16 specifying the physical addresses. Consequently, the data element and parity can be written to the storage area corresponding to this physical address, and the data element and parity can be read from the storage area corresponding to this physical address.

Figure 3:
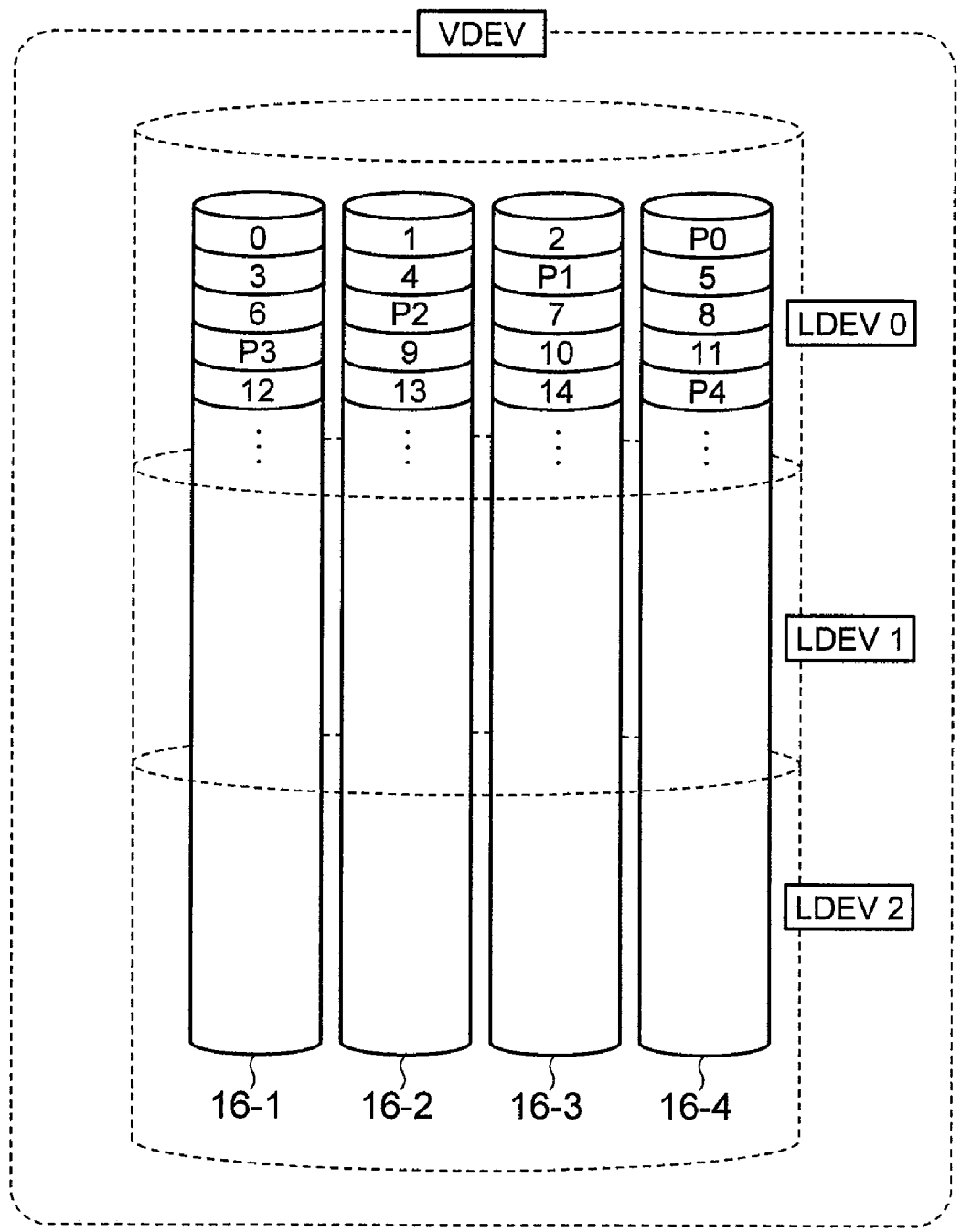
FIG. 3 is a diagram showing an example of the relationship between a plurality of HDDs constituting a RAID Group and logical volumes.

FIG. 3 is a diagram showing an example of the relationship between a plurality of HDDs 16 and logical volumes.

A single RAID group is configured from a plurality of (for example, four) HDDs 16-1, 16-2, 16-3 and 16-4. For example, when the RAID level is RAID 5, three data elements constituting a data unit are stored in three HDDs 16, and a P parity created based on these three data elements is stored in one other HDD 16.

In this embodiment, the storage area provided by this RAID Group (an aggregate of four HDDs 16 storage areas) is called a "VDEV", which is an abbreviation for Virtual Device. The respective VDEV parts obtained by partitioning this VDEV are called logical volumes in this embodiment. A logical volume is specified from the host 4, and is identified inside the storage system 1 as well. Accordingly, hereinafter a logical volume specified from the host 4 will be called a "LU" (Logical Unit), and a logical volume identified inside the storage system 1 will be called an "LDEV" (Logical Device). In the example of this diagram, three LDEV are created from one VDEV, but the number of LDEV can be either more or less than this (for example, there can be one LDEV for one VDEV).

A VDEV is configured from a plurality of rows of stripes. The respective rows of stripes are configured by four stripes corresponding to the four HDD 16-1, 16-2, 16-3 and 16-4. The storage area in a HDD 16 is partitioned into a plurality of prescribed size sub-storage areas (that is, stripes). A write for a data element or parity is carried out having a stripe as one unit.

Various tables comprising control information stored in the cache/control memory 14 will be explained hereinbelow by referring to FIGS. 4 through 8.

FIG. 4 is a diagram showing an example of the constitution of a RAID configuration table 400.

The RAID configuration table 400 is for managing the RAID configurations of the respective VDEV. More specifically, for example, this table 400 has a column 401 in which VDEV identification numbers are written, a column 402 in which HDD identification numbers are written, a column 403 in which RAID levels are written, and a column 404 in which stripe sizes (stripe storage capacities) are written. That is, in this table 400, a VDEV identification number, a plurality of HDD identification numbers constituting the pertinent VDEV, the RAID level of the pertinent VDEV, and a stripe size are written for each VDEV.

FIG. 5 is a diagram showing an example of the constitution of a VDEV configuration table 500.

The VDEV configuration table 500 is for managing the configuration of a VDEV. More specifically, for example, this table 500 has a column 501 in which VDEV identification numbers are written, a column 502 in which LDEV identification numbers are written, a column 503 in which the LDEV start addresses of ranges of logical addresses in the VDEV are written, and a column 504 in which the LDEV end addresses of ranges of logical addresses in the VDEV are written. That is, the identification number of an LDEV that exists in a range of logical addresses of a VDEV is written in this table 500.

FIG. 6 is a diagram showing an example of the constitution of an LU configuration table 600.

The LU configuration table 600 manages the respective LU configurations. More specifically, for example, this table 600 has a column 601 in which LDEV identification numbers are written, a column 602 in which WWNs (World Wide Names) are written, a column 603 in which LUNs (Logical Unit Numbers) are written, and a column 604 in which LDEV storage capacities are written. That is, in this table 600, an LDEV identification number, at least a set of WWN and LUN corresponding to the pertinent LDEV, and the storage capacity of this LDEV are written for each LU.

In this embodiment, a logical volume specified from the host 4 is referred to as "LU" as described hereinabove, and more specifically, for example, a logical volume correspondent to a WWN and LUN in the Fibre Channel protocol is referred to as LU. Furthermore, for example, the WWN and LUN columns 602 and 603 need not be provided for a mainframe.

FIG. 7 is a diagram showing an example of the constitution of an HDD failure-check table 700.

The HDD failure-check table 700 is for checking an HDD 16 in which a failure has occurred. More specifically, for example, this table 700 has a column 701 in which HDD identification numbers are written, and a column 702 in which a flag for identifying whether or not a failure has occurred is written. That is, the information in which HDD 16 a failure has occurred is written in this table 700.

FIG. 8 is a diagram showing an example of the constitution of a stripe failure-check table 800.

The stripe failure-check table 800 is for checking a stripe (for convenience of explanation, a "failed stripe"), of the stripes comprising the failed HDDs 16, from which a data element cannot be read out. This table 800 is respectively prepared for all of the HDDs 16 constituting a RAID Group. More specifically, for example, this table 800 has a column 801 in which stripe identification numbers are written, and a column 802 in which flags for identifying whether or not a failure has occurred are written. That is, the information of which stripes have failed is written in this table 800. Furthermore, in this figure, the identification number assigned for uniquely specifying the stripe comprising an HDD 16 is written in column 801 for each HDD 16, but like the identification numbers assigned in FIG. 3, the identification numbers assigned for uniquely specifying the stripes comprised in a RAID can also be written in column 801.

The preceding are explanations of the various tables. The storage system 1 related to this embodiment employs striping, which distributively writes data to a plurality of HDD 16 constituting a RAID Group like RAID 5 or RAID 6, but a method that differs from RAID 5 and RAID 6 is used to create and write parity. Hereinbelow, the layout of data elements and parities, and a restore processing carried out based on this layout will be called a "data protection mode". The storage system 1 related to this embodiment can employ two types of data protection modes. Either of these two types of data protection modes can restore a data unit which has suffered a double-failure. More specifically, when there exists double-failure data which is a data unit comprising two unreadable data elements in a single RAID group where an HDD from which data elements cannot be read out from any stripe (hereinafter, a completely failed HDD) and an HDD having a stripe from which a data element can be read out and a stripe from which a data element cannot be read out (hereinafter, partially failed HDD) exist, it is possible to restore these two data elements. Now then, in these two types of data protection modes, creating a compressed parity that is smaller in size than the total size of a plurality of parities corresponding to a plurality of data units on which the compressed parity is based consumes less storage capacity than RAID 6 which always creates two parities for one data unit. These two types of data protection modes will be explained in detail hereinbelow. Furthermore, the writing of data and parity to an HDD 16 is carried out by the disk I/O processing portion 902 executed by the CPU 131 of the DKA 13. Further, for both the first and second data protection modes, a stripe in which a compressed parity is stored will be called the "specific stripe" for convenience sake. Conversely, a stripe, which constitutes the write destination of data elements and parity, will be called a "normal stripe". A normal stripe from which it is impossible to read out a data element or parity is the above-mentioned "failed stripe".

Figure 9:
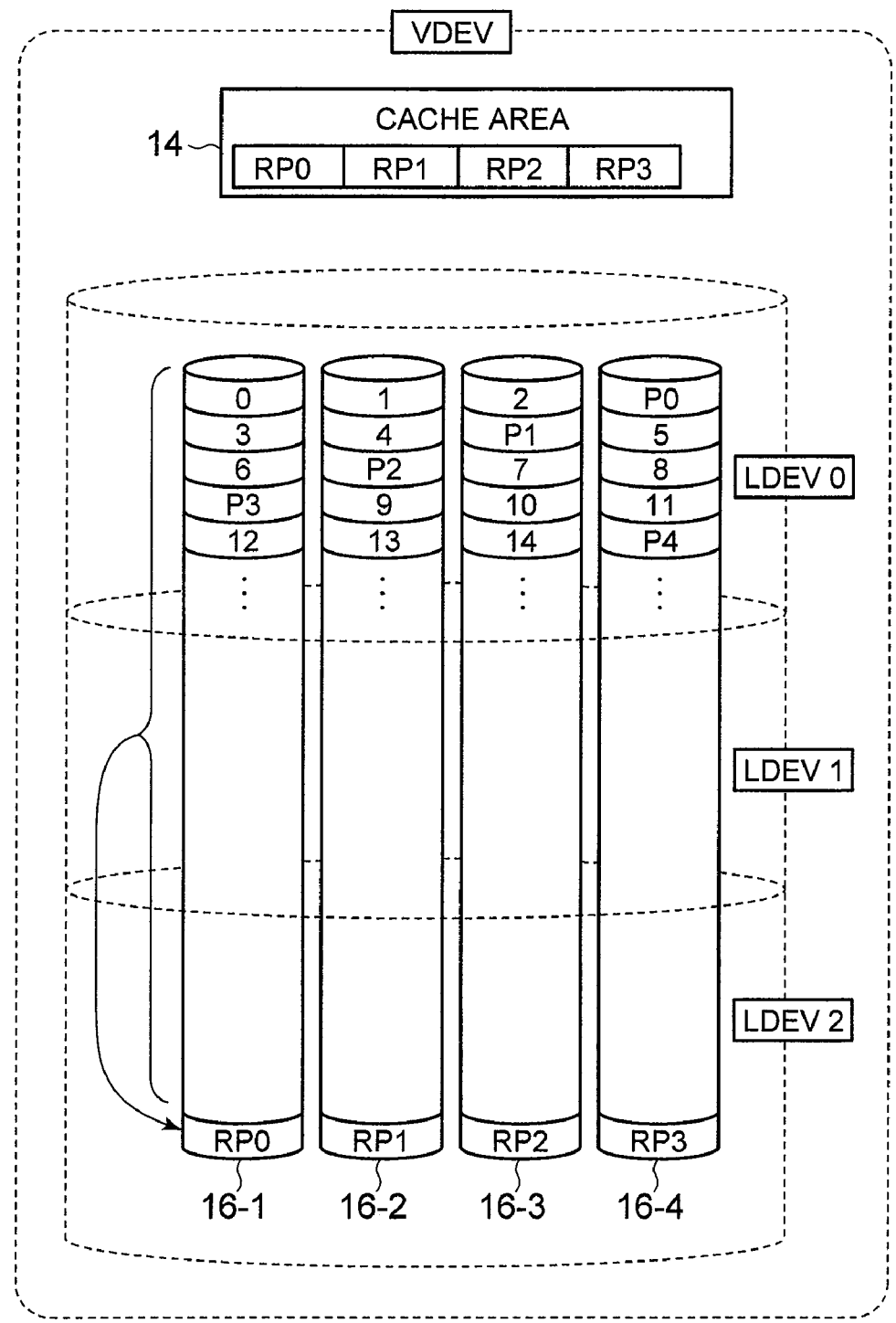
FIG. 9 is an illustration of an example of the data layout in a first data protection mode.

FIG. 9 is an illustration of an example of the data layout in the first data protection mode.

First, the manner in which the data elements and parity are laid out in the HDD 16 in the first data protection mode will be explained.

In the first data protection mode, a compressed parity created from the data elements and P parities of all the stripes comprised in an HDD 16 are written for each HDD 16. This compressed parity is created by computing the exclusive OR of the data elements and P parities stored in all the normal stripes corresponding to the HDD 16 (or, by applying a prescribed coefficient to these data elements and P parities, and subsequently computing the exclusive OR therefor). The locations of the stripes in which the compressed parities are written (that is, the specific stripes), for example, can be at the tail ends of the respective HDD 16 as shown in the figure. In other words, the row of stripes at the tail end of the VDEV is a row of specific stripes constituted by four specific stripes. Furthermore, a specific stripe can be a stripe other than that at the tail end of an HDD 16.

In this embodiment, four compressed parities respectively corresponding to the four HDD 16-1 through 16-4 exist in the cache area of the cache/control memory 14, and are written from the cache area to the specific stripes in a timely manner. For example, when a compressed parity is updated in response to the receiving of a write request, this updated compressed parity can be written to both an HDD 16 and the cache area upon being updated, or can also be written solely to the cache area without being written to an HDD 16. In the latter case, at a subsequent prescribed timing, at least one of the four compressed parities written to the cache area (for example, either all of the compressed parities or only the updated compressed parity) is copied to a specific stripe in the HDD 16. By so doing, the time required for a write is shortened since the HDD 16 stripe in which the compressed parity is written is not accessed each time a data write is carried out in response to receiving a write request. This will be explained by referring to an example when the compressed parity in the HDD 16-1 is updated. Compressed parity "RP0", which corresponds to HDD 16-1, is created based on the data elements and P parity (data elements "0", "3", and "6" and P parity "P3") written in the normal stripes of HDD 16-1, and this is written to the cache area and the HDD 16-1. The creation and writing of the compressed parities "RP1" through "RP3" in the other HDD 16-2 through 16-4 are the same as the case of the compressed parity "RP0" in HDD 16-1.

The first data protection mode is substantially the same as the data protection mode of RAID 5, with the exception of a compressed parity being written. Therefore, when there are a total of four HDDs 16 constituting the RAID Group as in this figure, three data elements (for example, data elements "0", "1" and "2"), which constitute a data unit, are written to three of these HDDs 16, and one P parity (for example, P parity "P0"), which is based on this data unit, is written to the one remaining HDD 16. That is, if it is supposed that the number of HDDs 16 constituting the RAID Group is N (N is an integer of no less than 3), one data element is written to each of (N−1) HDDs 16, that is, a total of (N−1) data elements is written to (N−1) HDDs 16, and a single P parity, which is created based on these (N−1) data elements, is written to the one remaining HDD 16. The P parity is distributively written to the four HDDs 16-1 through 16-4. In other words, the HDD 16 to which a P parity is to be written, shifts for each data unit.

Next, the updating of the data elements and P parity will be explained in accordance with the first data protection mode. Furthermore, in the following explanation, a pre-updated data element is referred to as an "old data element", and a post-updated data element is referred to as a "new data element" (the same holds true for a P parity and a compressed parity).

For example, it is supposed that data element "1" of the three data elements constituting the first data unit is updated. In this case, P parity "P0" and compressed parity "RP1" must be updated. This is because both the P parity "P0" and the compressed parity "RP1" were created based on the old data element "1", and if data element "1" is updated, the values of P parity "P0" and compressed parity "RP1" will change.

Accordingly, disk I/O processing portion 902 first reads out the old data element "1", which is required to create P parity "P0", and old P parity "P0" from HDDs 16-2 and 16-4. Then, the disk I/O processing portion 902 can create a new P parity "P0" based on the new data element "1", old data element "1" and old P parity "P0" (or, can create a new P parity "P0" from data elements "0" and "2", which have not been updated, and the new data element "1"). Further, the disk I/O processing portion 902 also carries out the creation of a new compressed parity "RP1" using the same kind of method as that for the creation of the new P parity "P0". That is, the disk I/O processing portion 902 can create a new compressed parity "RP1" based on the old compressed parity "RP1" corresponding to HDD 16-2, the old data element "1" and the new data element "1" (or, the disk I/O processing portion 902 can read out from HDD 16-2 a data element other than the old data element "1" and the P parity, and create a new compressed parity "RP1" based on the read-out data element and P parity, and the new data element "1"). Thereafter, the disk I/O processing portion 902 writes the new data element "1" to the normal stripe in which the old data element "1" is stored, and writes the new P parity "P0" to the normal stripe in which the old P parity "P0" is stored. Further, the disk I/O processing portion 902 writes the new compressed parity "RP1" to the cache area, and at a prescribed timing, writes the new compressed parity "RP1" in the cache area to the specific stripe in which the old compressed parity "RP1" is stored.

Figure 10:
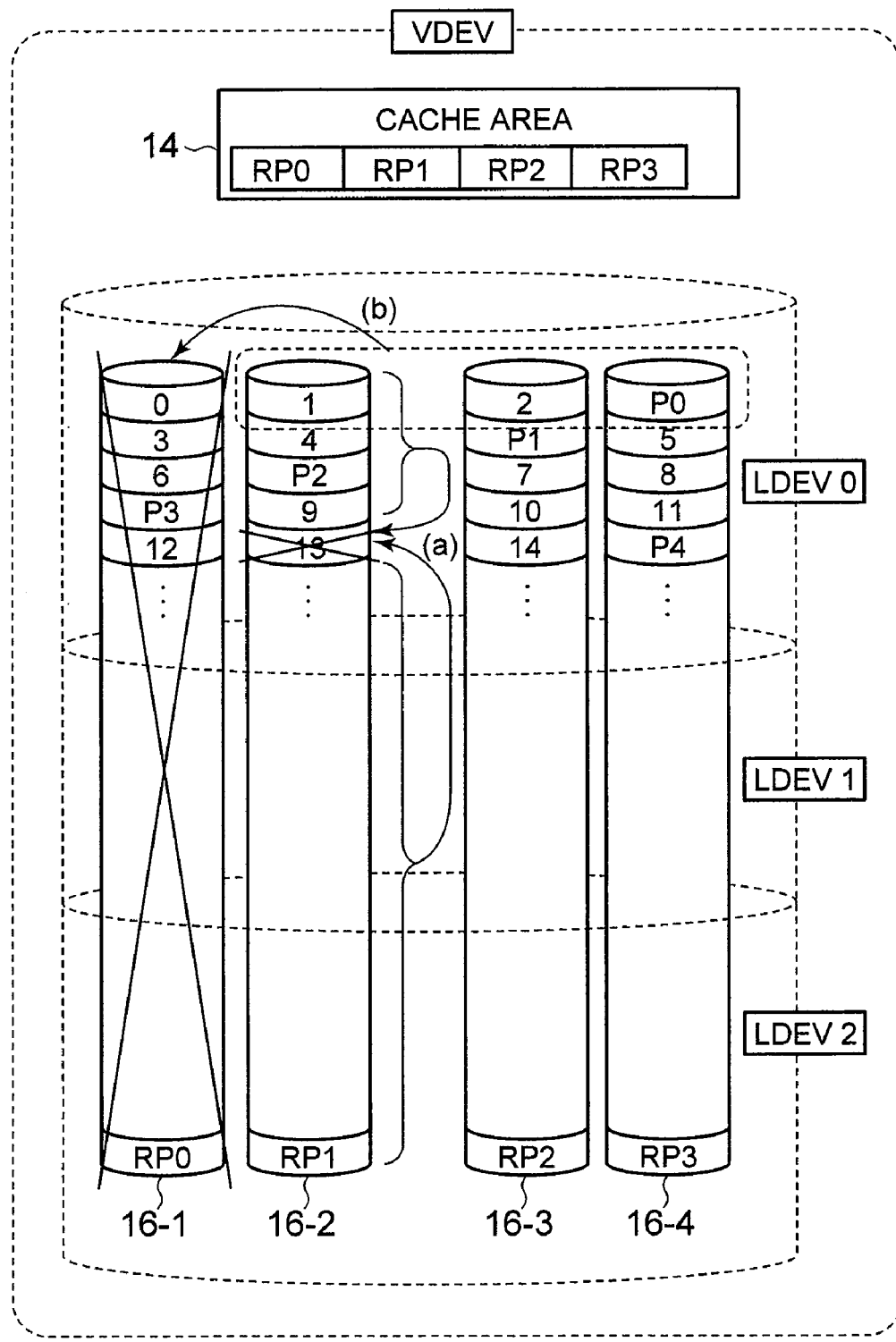
FIG. 10 is an illustration of a restore in the first data protection mode.

FIG. 10 is an illustration of a restore in the first data protection mode. Furthermore, in the following explanation, a data unit in which there is only one data element that cannot be read out and which is not double-failure data (as explained hereinabove, a data unit comprising two unreadable data elements) will be referred to as a "single-failure data".

In this figure, HDD 16-1 is a completely failed HDD, and HDD 16-2 is a partially failed HDD. In this partially failed HDD 16-2, the normal stripe, in which data element "13" is stored, is the failed stripe.

The restore procedure for a data element, which constitutes a single-failure data, is the same as ordinary RAID 5. That is, the data element constituting the single-failure data, which is stored in the failed stripe of completely failed HDD 16-1, is restored using all of the other data elements constituting this single-failure data, and the P parity corresponding to this single-failure data (in other words, using the data elements and P parity, which are in all the other stripes in the row of stripes comprising this failed stripe).

Conversely, two unreadable data elements, which constitute double-failure data, cannot be restored using the same procedures as that of an ordinary RAID 5. This is because there is only one parity corresponding to the double-failure data. In this example, the two data elements "12" and "13" cannot be restored using only the remaining data element "14" and the P parity "P4".

Accordingly, the restoration of these two data elements is carried out using the compressed parity as follows.

First, data element "13", which is stored in the failed stripe in the partially failed HDD 16-2, is restored. More specifically, data element "13" is restored in accordance with the exclusive OR calculation of the data elements and P parity stored in all the normal stripes other than the failed stripe in the partially failed HDD 16-2, and the compressed parity "RP1" corresponding to this partially failed HDD 16-2 (the compressed parity "RP1" stored in either the cache area or the specific stripe) ((a) of this figure).

Next, data element "12", which is stored in the failed stripe of the completely failed HDD 16-1, is restored based on this data element "13", and the other data element "14" in the data unit comprising this data element "13" and the P parity "P4" corresponding to this data unit. Consequently, both data elements "12" and "13" in the double-failure data are restored.

Lastly, the compressed parity, which is stored in the specific stripe of the completely failed HDD 16-1, is restored. More specifically, the compressed parity "RP0" is restored based on the restored data element "12" of the double-failure data which is stored in the failed stripe of the completely failed HDD 16-1, and the other data elements and P parity which were restored the same as in RAID 5.

The preceding is an explanation for the first data protection mode.

Furthermore, in the above-described processing, when a P parity instead of a data element is stored in the failed stripe of a partially failed HDD, the P parity stored in this failed stripe is restored based on the compressed parity corresponding to this partially failed HDD, and the data elements and P parity stored in the normal stripes other than the failed stripe of this partially failed HDD. Then, using this restored P parity, the data element stored in the failed stripe of the completely failed HDD is restored using the same method as that of an ordinary RAID 5.

According to the above explanation, in the first data protection mode, all HDDs other than the completely failed HDD can be partially failed HDDs. Moreover, to restore a data element stored in a partially failed HDD requires that only one failed stripe exist in the partially failed HDD.

Further, in the description of the first data protection mode mentioned above, the total size of one data unit and the P parity corresponding thereto is the same size as one row of stripes. More specifically, one data unit and the P parity corresponding thereto fits in one row of stripes, and do not span a plurality of rows of stripes. However, the present invention is not limited to this, and, for example, similar to the example of the second data protection mode which will be explained hereinbelow, the total size of one data unit and the P parity corresponding thereto can be smaller than the size of one row of stripes.

Figure 11:
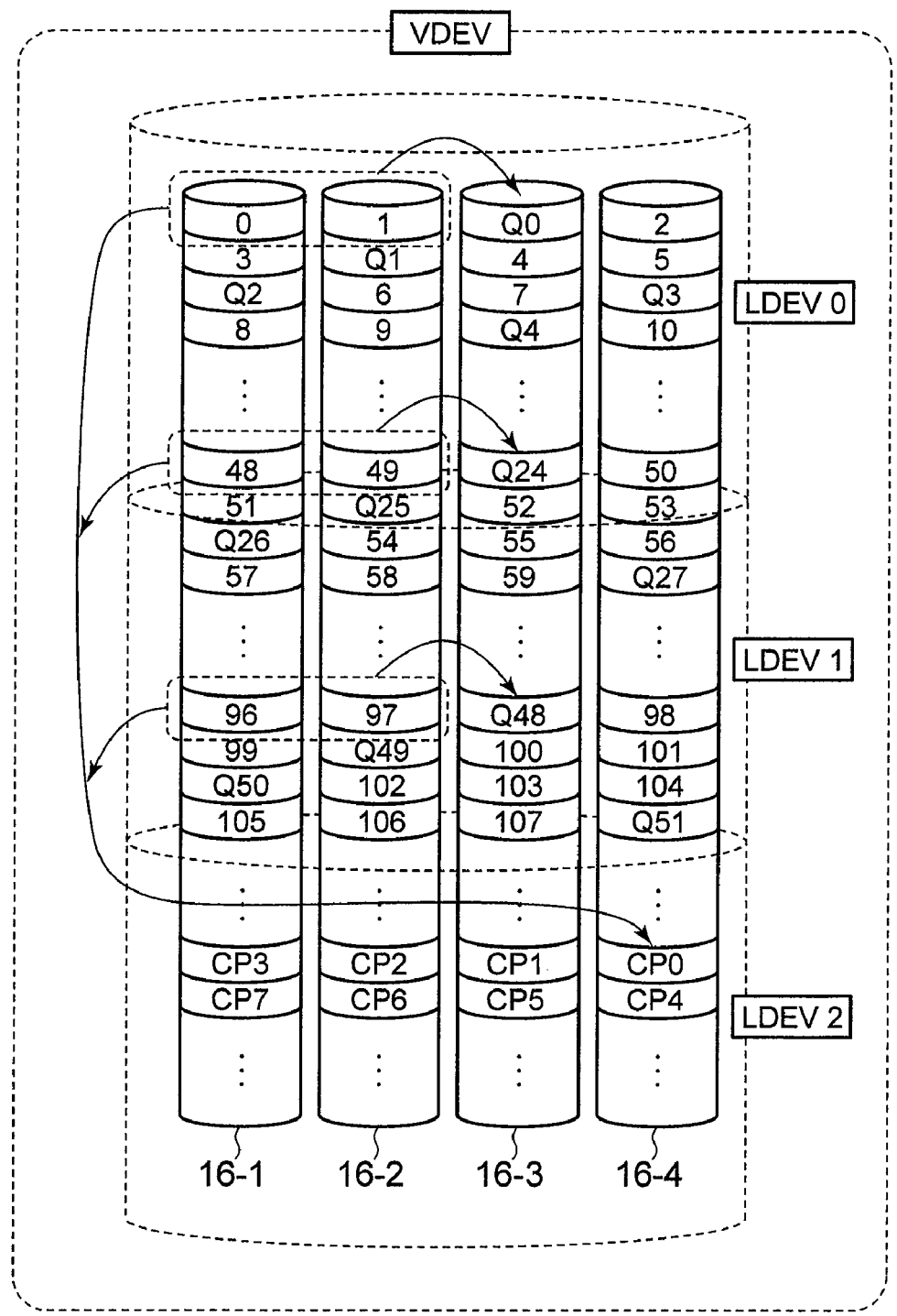
FIG. 11 is an illustration of an example of the data layout in a second data protection mode.

FIG. 11 is an illustration of an example of the data layout in the second data protection mode.

In the second data protection mode, unlike the first data protection mode, Q parity (a second redundant code) as well as P parity is created for one data unit similarly in RAID 6. However, only Q parity is written to the RAID Group for each data unit; P parity is not written for each data unit. With regard to P parity, a plurality of P parities, which correspond to a plurality of data units, are compressed into a single compressed parity, and written to the RAID Group. Consequently, it is possible to conserve the consumed storage capacity of the RAID Groups while enabling to restore two data elements in double-failure data.

In the second data protection mode, it is supposed that N is the number of HDDs 16 constituting the RAID Group, and data is written to (N−2) stripes, and Q parity is written to the stripe comprised in either one of the remaining two HDD 16. That is, in the second data protection mode, the size of one row of stripes is larger by one stripe than the total size of the data unit and Q parity.

In the second data protection mode, as was explained hereinabove, the compressed parity written to the specific stripe is the code which is created by compressing a plurality of P parities corresponding to a plurality of data units into one parity, more specifically, by computing the exclusive OR of this plurality of P parities. In the example described in FIG. 11, for example, one compression code is created based on three P parities, which correspond to three data units. More specifically, for example, the compressed parity "CP0" is created by computing the exclusive OR of a first P parity corresponding to a first data unit (the exclusive OR of data elements "0" and "1"), a second P parity corresponding to a second data unit (the exclusive OR of data elements "48" and "49"), and a third P parity corresponding to a third data unit (the exclusive OR of data elements "96" and "97").

In the second data protection mode, a plurality of specific stripes exist in one HDD 16. Thus, a plurality of rows of specific stripes exists in a VDEV. The plurality of rows of specific stripes can be distributed in the VDEV, or, as shown in the figure, the plurality of rows of specific stripes can exist as consecutive rows of specific stripes at the tail end of the VDEV.

In the second data protection mode of this embodiment, the following first and second rules are observed.

The first rule is that the compressed parity be written to a stripe of an HDD 16 that differs from the HDD in which the plurality of data units corresponding to the plurality of P parities which constitute the basis of the compressed parity, and the plurality of Q parities corresponding to these pluralities of data units are stored. This is to avoid a situation in which the compressed parity, and either the data elements in the respective data units corresponding thereto or the Q parities corresponding to the respective data units cannot be read out simultaneously as the result of a HDD 16 failure. For example, the layout of the compressed parity "CP0" will be explained. When the two data elements constituting the data unit which corresponds to the compressed parity "CP0" are written to HDDs 16-1 and 16-2, and when the Q parity corresponding to this data unit is written to HDD 16-3, the compressed parity "CP0" is written to HDD 16-4. In other words, the plurality of data units corresponding to the plurality of P parities, which should be the basis for the compressed parity written to HDD 16-4, should be the data units written to HDDs 16-1 and 16-2. This is because the write destination of the Q parities, which correspond to these data units, is HDD 16-3, and the only HDD that is not duplicated is HDD 16-4.

The second rule is that, between the $m^{th}$ data unit and the Q parity thereof corresponding to a compressed parity, and the $m+1^{th}$ data unit and the Q parity thereof corresponding to the same compressed parity (that is, the subsequent data unit and the Q parity thereof), a prescribed number of normal stripes that don't correspond to the compressed parity exist. In other words, the second rule is that a prescribed number of rows of normal stripes exist between the row of normal stripes in which exist the $m^{th}$ data unit and the Q parity thereof corresponding to the compressed parity, and the row of normal stripes in which exist the $m+1^{th}$ data unit and the Q parity thereof corresponding to this compressed parity. Therefore, for example, for the compressed parity "CP0", the data units corresponding to the compressed parity "CP0" cannot be just any data units stored across HDDs 16-1 and 16-2, but rather must be the data units stored across HDDs 16-1 and 16-2, which are separated by a prescribed number of rows of normal stripes. As will be explained in more detail below, this is because if there is only one double-failure data in a plurality of data units corresponding to the compressed parity, the two unreadable data elements constituting this double-failure data can be restored, but if there is two or more double-failure data in this plurality of data units, restoration becomes impossible.

According to the second data protection mode, the larger the number of data units corresponding to one compressed parity, the more it is possible to reduce the number of compressed parities written to the RAID Group. However, it makes the spacing between the data units corresponding to the same compressed parity smaller. That is, the number of stripes that exist between a data unit and the Q parity corresponding thereto, and the subsequent data unit and Q parity becomes fewer (in other words, there are fewer rows of stripes between the rows of stripes in which these data units exist). When the spacing between the data units corresponding to the compressed parity is narrow, there is the danger that when there is one completely failed HDD, and one partially failed HDD is generated due to the failure of yet the other HDD 16, two or more of the plurality of data units corresponding to the compressed parity will constitute double-failure data at the same time. A possible method for avoiding this is one, which lowers the number of the data units corresponding to the compressed parity, and makes the spacing between the data units corresponding to the compressed parity sufficiently wide. However, it increases the number of compressed parities written to the RAID Group. From this standpoint, in this embodiment, the spacing between data units corresponding to a compressed parity is configured at an appropriate width based on the structure of the respective HDD 16 (for example, the recording densities). Thus, for example, the structures of the HDDs constituting the RAID Group are the same.

Figure 12:
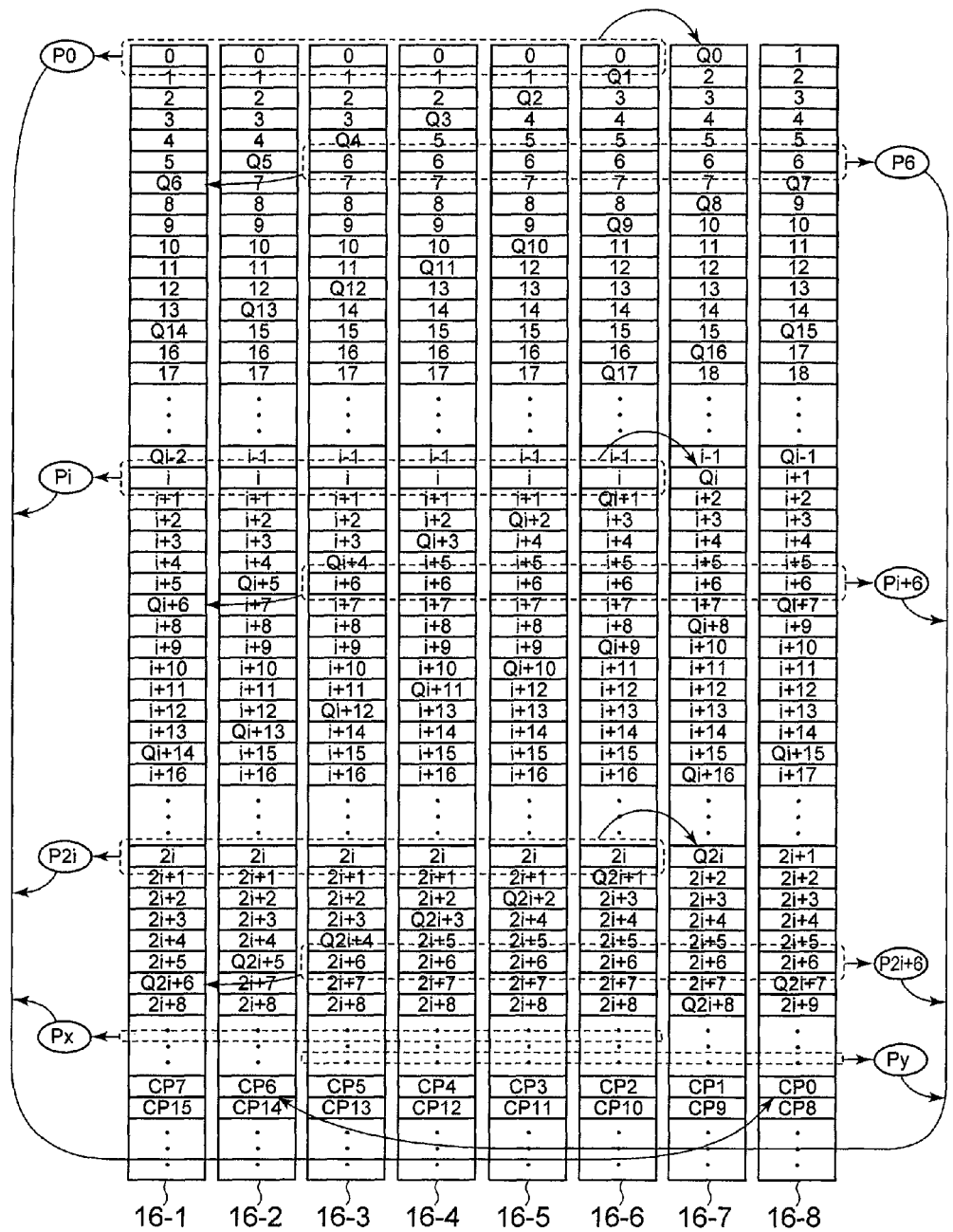
FIG. 12 is a more detailed illustration of an example of the data layout in the second data protection mode.

FIG. 12 is a diagram for explaining in more detail a write in the second data protection mode.

In the example of this figure, the RAID Group is made up of eight HDDs 16-1 through 16-8. As described hereinabove, the storage capacity of each HDD 16 is partitioned into a plurality of stripes. One area, which has been provided a number, is one stripe. In this example, unlike the examples shown in FIG. 3 and FIGS. 9 through 11, the numbers recorded in the respective stripes are not data element or parity identification numbers, but rather are identification numbers for identifying the data units. Moreover, the letter "Q" provided in front of these identification numbers shows the Q parity corresponding to the relevant data unit.

An i number of other data units exists between data units and Q parity and subsequent data units and Q parity, which correspond to compressed parity "CP0". The i is an integer of 1 or greater based on the above-mentioned second rule. Furthermore, the selection criteria for i will be explained below. The compressed parity "CP0" corresponds to data units "0", "i", "2i", "3i", ... (these identification numbers are multiples of i for all the other rows of stripes comprised in this RAID Group). More specifically, it is supposed that the P parity of data unit "0" is P parity "P0", the P parity of data unit "i" is P parity "Pi", and the P parity of data unit "2i" is P parity "P2i". Further, it is supposed that the value used to compute the exclusive OR of all the P parities corresponding to all the data units beginning with and subsequent to data unit "3i", which correspond to compressed parity "CP0", is "Px". This being the case, compressed parity "CP0" constitutes P0, P1, P2i and Px. In conformance to the first rule, compressed parity "CP0" is written to HDD 16-8, in which there are written no data units or Q parities constituting the basis thereof.

The other compressed parities are also created and written in substantially the same manner as compressed parity "CP0". For example, compressed parity "CP6" is the exclusive OR of P parity "P6" corresponding to data unit "6", P parity "Pi+6" corresponding to data unit "i+6", P parity "P2i+6" corresponding to data unit "2i+6", and the exclusive OR value "Py" of the P parities corresponding to data units beginning with data unit "3i+6" and beyond. In conformance with the first rule, this compressed parity "CP6" is written to HDD 16-2, in which there are written no data units or Q parities constituting the basis thereof.

Figure 13:
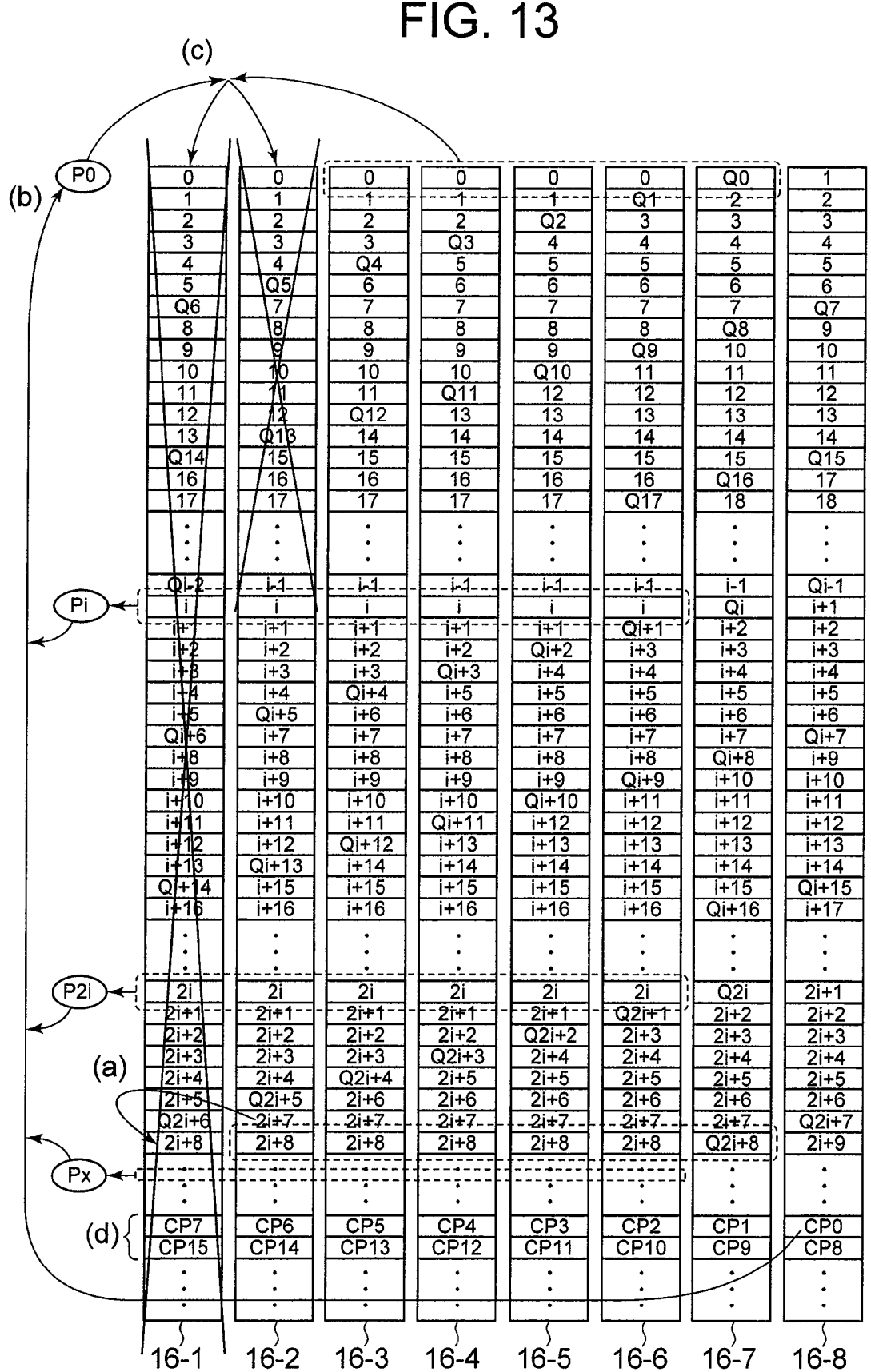
FIG. 13 is an illustration of a restore in the second data protection mode.

FIG. 13 is an illustration of a restore in the second data protection mode.

Two unreadable data elements in double-failure data can be restored in the second data protection mode similarly to the first data protection mode, but the conditions for restorability related to the partially failed HDD will differ at this time. That is, in the first data protection mode, any HDD other than the completely failed HDD can be a partially failed HDD, but only one failed stripe can exist in the respective partially failed HDDs. By contrast, in the second data protection mode, only one partially failed HDD can exist in one RAID Group, but these is no limit to the number of failed stripes that can exist in this one partially failed HDD. However, only one double-failure data can exist in the plurality of data units corresponding to one compressed parity.

In this figure, HDD 16-1 is the completely failed HDD, and HDD 16-2 is the partially failed HDD. In the HDD 16-2, failed stripes exist so that only data unit "0" among the plurality of data units corresponding to compressed parity "CP0" constitutes double-failure data and that the other data units ("i", "2i", "3i", ... ) do not constitute double-failure data.

Figure 23:
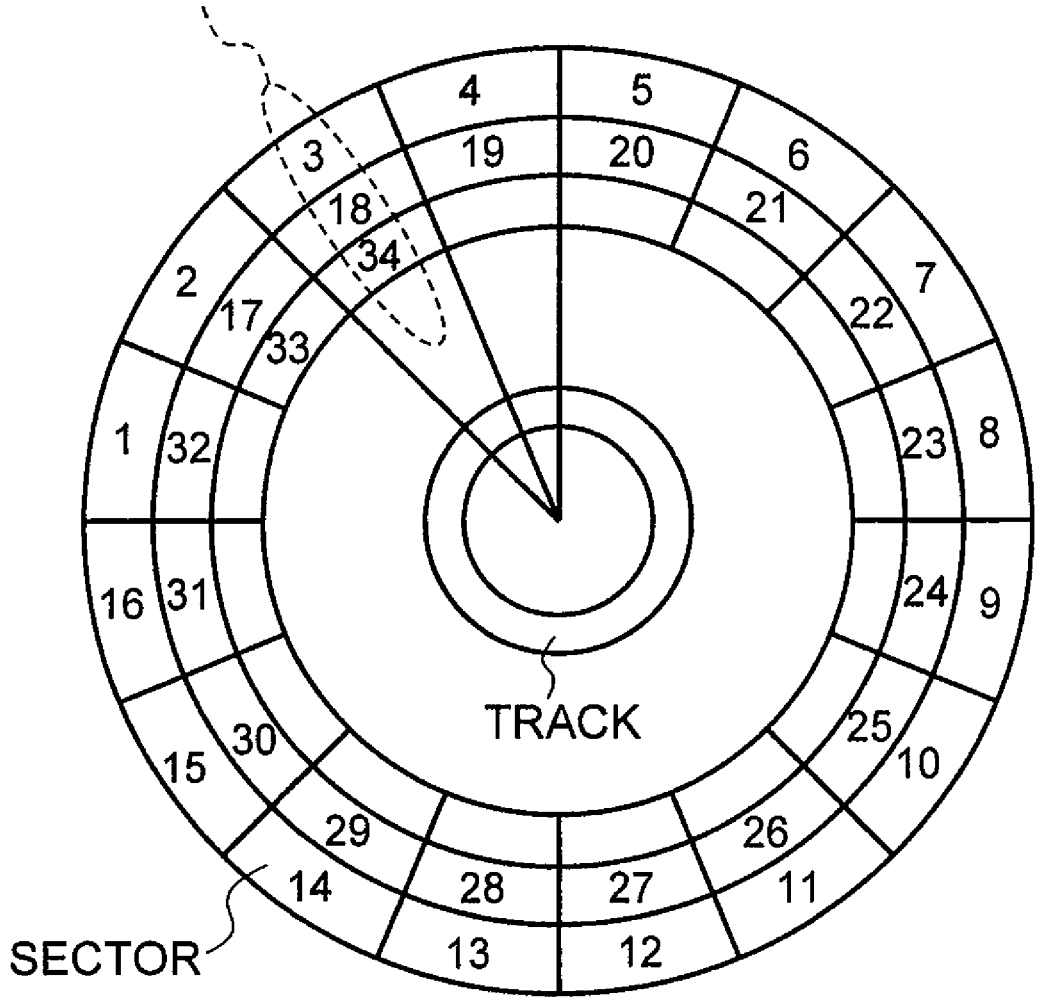
FIG. 23 is an illustration of an example of the sector layout of a storage medium inside an HDD.

An example of the selection of the value "i", which shows the spacing between a data unit and a subsequent data units corresponding to compressed parities "CPx" (where x is an integer) will be explained. FIG. 23 shows an example of the layout of the data (sectors) on a storage medium (magnetic disk) inside an HDD 16, and the scope of failure, when a partial failure occurs on this storage medium. Areas to which the numbers 1, 2, 3, ... , have been allocated are fixed-length (512 bytes on an ordinary hard disk) areas called "sectors". A plurality of sectors is arranged concentrically on a storage medium inside an HDD 16. A set of one concentric circle's worth of sectors is called a "track". Further, in FIG. 23, the area depicted by an oval-shaped dotted line is an example of the place where a partial failure occurred in the storage medium. In general, when a partial failure occurs in a storage medium, if the one track in which the failed sector is arranged is observed, the scope of failure will be confined to one sector inside this track. However, the scope of this failure most often extends across a plurality of tracks (generally around 10 tracks). For this reason, the characteristics of this partial failure are taken into account when configuring the spacing between one data unit and the subsequent data unit corresponding to a compressed parity "CPx".

This will be explained further based on FIGS. 12 and 23. In FIG. 12, if it is supposed that the size of a single stripe is 4 KB (kilobytes), one stripe of HDD 16-1, for example, stripe 0, is the size of eight sectors in the storage medium shown in FIG. 23, that is, stripe 0 corresponds to sectors 1 through 8. In the sector layout example shown in FIG. 23, since there are 16 sectors, that is, 8 KB of sectors arranged in one track, two stripes are arranged in one track. That is, stripes 0 and 1 of FIG. 12 are arranged in the initial track (the outermost track), and then stripes 2 and 3 are arranged in the next concentric track, respectively. In creating the compressed parity "CP0", stripes 0, "i" and "2i" are used. When data is restore based on a compressed parity, if one of the stripes used to create the compressed parity fails, restoration is possible, but when this is not the case, restoration becomes impossible. If it is supposed that the scope of the partial failure in the storage medium shown in FIG. 23 is confined within 10 tracks in most cases, in the case of the example used herein, that is, the example in which two stripes are arranged in one track, the spacing between stripe 0 and stripe "i" (or, similarly, between stripe "i" and stripe "2i") is laid out by separating these stripes by more than five tracks. Consequently, when a partial failure occurs, it is possible to avoid a situation in which stripe 0 and stripe "i" simultaneously become inaccessible (unreadable) (more accurately, it is possible to lower the probability of them becoming inaccessible at the same time). Thus, in this case, i may be configured at no less than five.

An overview of the restore procedure in the second data protection mode is as follows.

First, the respective data elements in the respective single-failure data, which is stored in the failed stripes of the completely failed HDD 16-1, are restored via the similar procedures to RAID 5 using the Q parities corresponding to the respective single-failure data ((a) in the figure). Furthermore, when a Q parity is stored instead of a data element, the Q parity is restored on the basis of the normal data unit, which does not constitute a single-failure data.

Next, the P parities, which correspond to double-failure data in the plurality of data units corresponding to the compressed parity, are restored for the respective compressed parities ((b) in FIG. 13). More specifically, for example, P parity "P0", which corresponds to double-failure data "0", is restored based on compressed parity "CP0", and the parities "P1", "P2*i*" and "Px" other than P parity "P0" corresponding to double-failure data "0".

Thereafter, the two data elements in the double-failure data are restored in accordance with the same procedure as RAID 6 ((c) in the figure). More specifically, the two unreadable data elements in double-failure data "0" (the data elements stored in completely failed HDD 16-1 and partially failed HDD 16-2) are restored on the basis of the restored P parity "P0" and the Q parity corresponding to double-failure data "0".

Finally, the respective compressed parities stored in the respective specific stripes of completely failed HDD 16-1 are restored ((d) in the figure). More specifically, for example, since all of the double-failure data in the normal data units has been restored in accordance with (a) through (c) in the figure, P parities are created based on the restored normal data units, and compressed parities "CP7", "CP15" and so forth, which are stored in the completely failed HDD 16-1, are restored on the basis of the created P parities, and the P parities corresponding to the other data units, which correspond to the compressed parity to which these data units correspond.

The preceding are explanations of the first and second data protection modes. Furthermore, in both of these data protection modes, unreadable data elements in single-failure data and double-failure data for a completely failed HDD and partially failed HDD are restored to a prescribed storage resource, for example, a spare HDD.

The flows of the various processing carried out in this embodiment will be explained hereinbelow.

Figure 14:
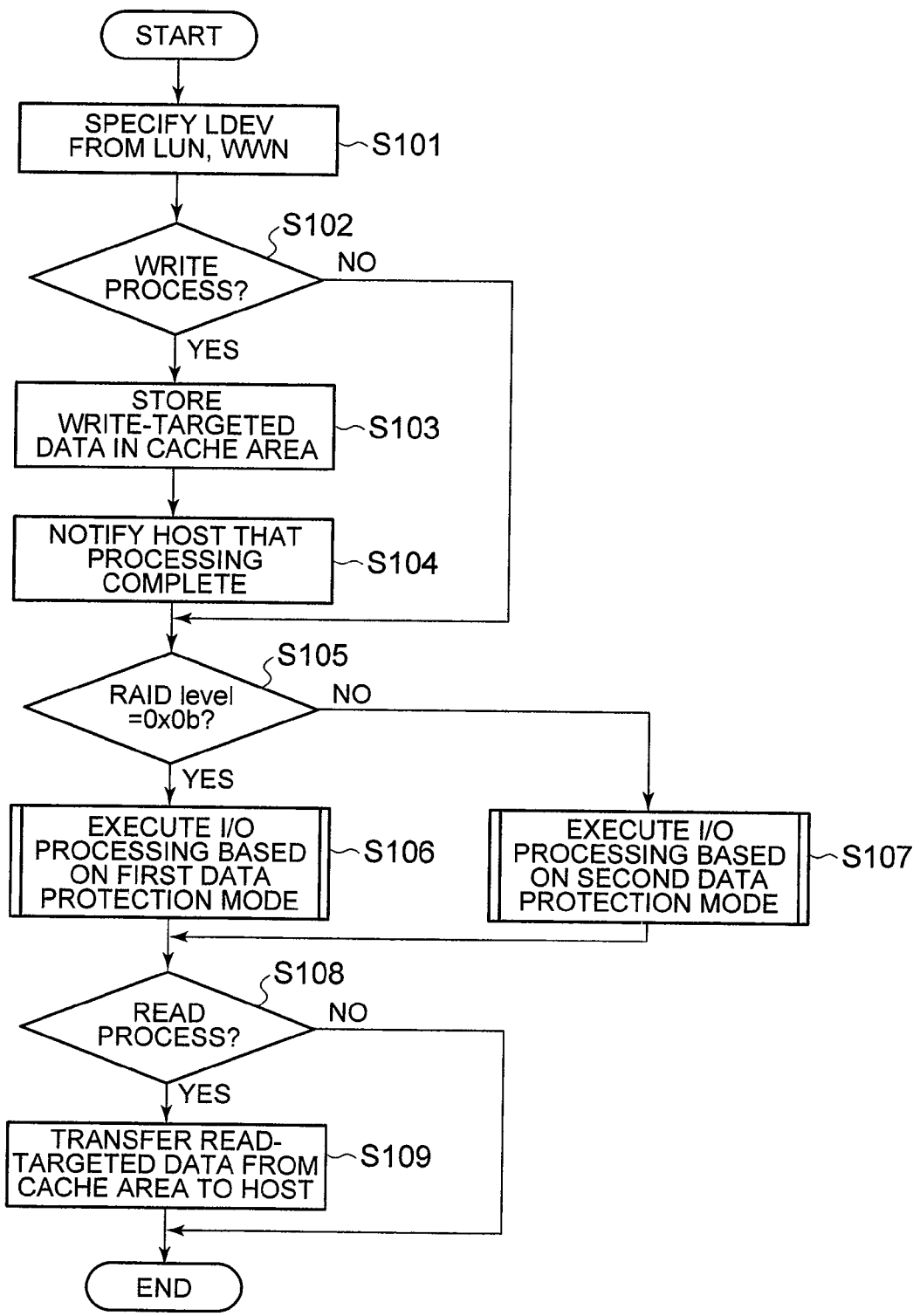
FIG. 14 is a flowchart of processing carried out by a command processing portion when the storage system receives an I/O request from the host.

FIG. 14 is a flowchart of processing carried out by the command processing portion 901 when the storage system 1 receives an I/O request from the host 4.

When accessing an LU, the host 4 issues the storage system 1 an I/O request specifying the WWN and LUN assigned to the LU, and the read- or write-targeted address (LBA: Logical Block Address). In response to receiving this I/O request, the command processing portion 901 refers to the LU configuration table 600, and determines the LDEV identification number (LDEV number) corresponding to the LUN and WWN (S101). Next, the command processing portion 901 determines whether or not the I/O request from the host 4 is a write request (S102). When the I/O request is a write request (S102: YES), processing proceeds to S103, and when the I/O request is not a write request (a read request) (S102: NO), processing moves to S105.

In S103, the command processing portion 901 stores the write-data (write-targeted data accompanied by the I/O request) in an unused area of the cache area of cache/control memory 14, and in S104, notifies the host 4 that the relevant write processing is complete. The processing of S104 can also be carried out subsequent to this, for example, after S105. At the point in time of S104, the data write to the HDD 16 is not complete, but notifying processing-complete to the host 4 when the write-data is stored in the cache area makes it possible to shorten write process response time.

In S105, the command processing portion 901 refers to the RAID configuration table 400 and the VDEV configuration table 500, and determines the RAID level of the VDEV comprising the LDEV to which the LDEV number determined in S101 is assigned.

When the value of the RAID level is "0x0b" (S105: YES), the command processing portion 901 executes a read or write process for the LDEV to which the LDEV number determined in S101 is assigned, on the basis of the first data protection mode (S106). This processing will be described in detail using FIG. 15.

Conversely, when the value of the RAID level is "0x0a" (S105: NO), the command processing portion 901 executes a read or write process for the LDEV, to which the LDEV number determined in S101 is assigned, on the basis of the second data protection mode (S107). This processing will be described in detail using FIGS. 18 and 19.

In S108, the command processing portion 901 determines if the received I/O request is a read request. When the relevant request is a read request (S108: YES), since the read-targeted data from the HDD 16 is stored in the cache area by the above-described processing of either S106 or S107, the command processing portion 901 returns the read-targeted data in the cache area to the host 4 (S109). In S108, when it is determined that the relevant request is not a read request (S108: NO), this processing ends.

Figure 15:
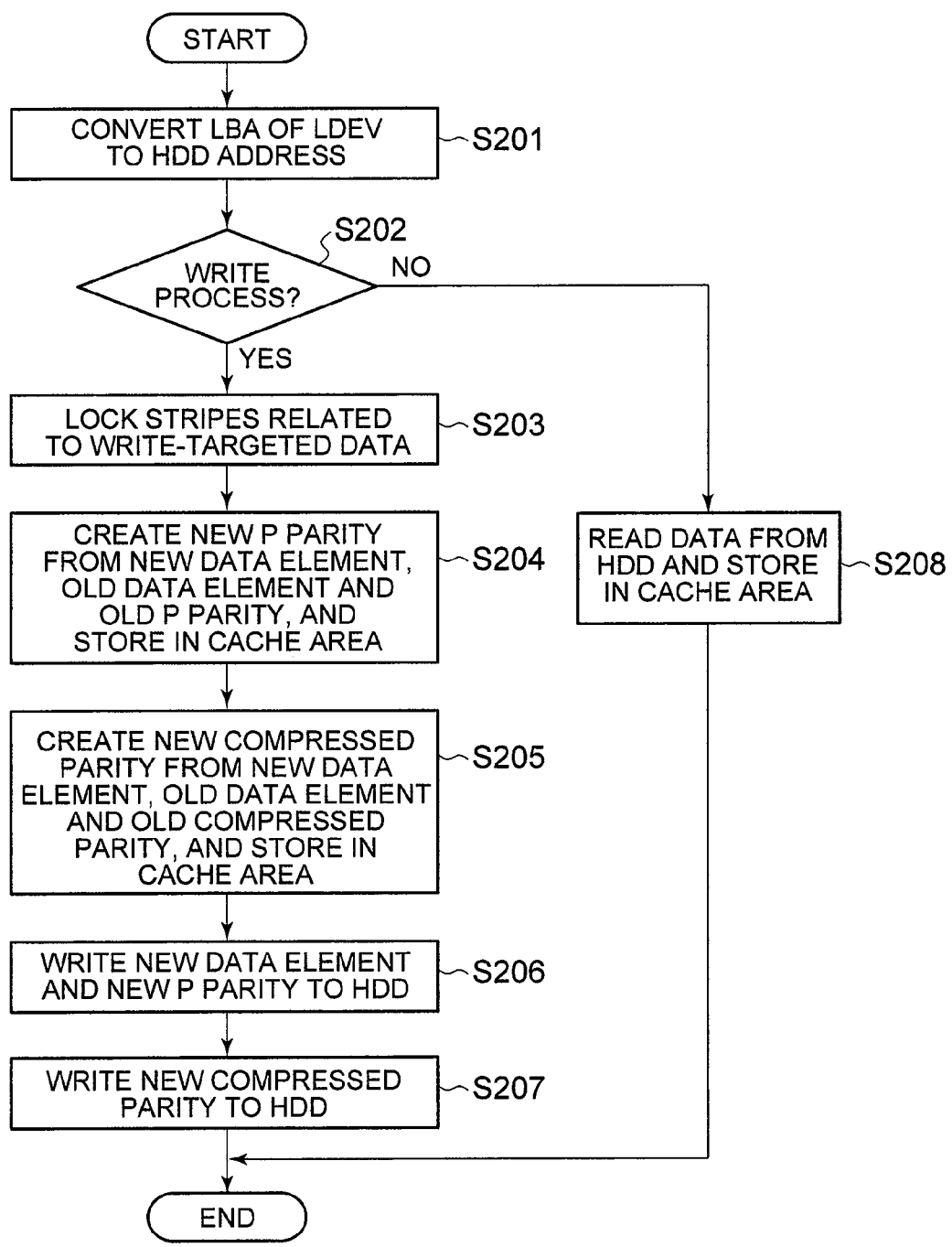
FIG. 15 is a flowchart of I/O processing based on the first data protection mode.

FIG. 15 is a flowchart of I/O processing based on the first data protection mode.

In the explanation of FIG. 15, the LDEV targeted by the I/O request will be referred to as the "target LDEV", the respective HDDs which belong to the VDEV comprising the target LDEV will be referred to as the "target HDD", and the address in the HDD, to which the LDEV area specified by the LBA which is specified in the I/O request from the host 4 is made correspondent, will be called the "target physical address".

In S201, the LBA specified in the I/O request from the host 4 is converted to the target physical address. More specifically, for example, the command processing portion 901 sends to the DKA 13 an I/O request comprising the LBA specified in the I/O request from the host 4, and the disk I/O processing portion 902 inside the DKA 13 receives this I/O request. This I/O request can be written to the control area of the cache/control memory 14, and it can be sent to the DKA 13 via the internal switch 15. The DKA 13, which receives the I/O request, is the DKA 13 connected to the respective target HDD 16. The disk I/O processing portion 902 of the relevant DKA 13 converts the LBA contained in the received I/O request to the target physical address.

In S202, the disk I/O processing portion 902 determines whether or not the received I/O request is a write request. If the received I/O request is a write request (S202: YES), this processing proceeds to S203, and if the received I/O request is a read request (S202: NO), this processing moves to S208. Furthermore, the processing of S202 may be executed prior to S201 processing.

In S203, the disk I/O processing portion 902 locks the stripes related to the write for the write-targeted data placed in the cache area (for example, the stripes in which the respective data units, into which the write-targeted data has been divided, the P parities related to the respective data units, and an updated compressed parity are written) so as to make these stripes inaccessible to other requests. Since the storage system 1 handles a plurality of access requests from the host 4 simultaneously, there is the possibility of a plurality of updates being simultaneously generated to the stripes related to the writing of the write-targeted data. If the updating of a stripe required to create P parity is generated by this other access process in the midst of a P parity creation process (between S203 and S207), the contents of the P parity will become inconsistent. To prevent this from happening, a lock process is carried out.

In S204, the disk I/O processing portion 902 creates a new P parity from the new data element in the data unit, the old data element corresponding to the new data element, and the new P parity, and writes this created new P parity to the cache area. Furthermore, if the old data element and the old P parity are not stored in the cache area, the disk I/O processing portion 902 reads out the old data element and the old P parity from the HDD 16 prior to carrying out this process.

In S205, the disk I/O processing portion 902 creates a new compressed parity from the new data element, old data element and old compressed parity, and writes this created new compressed parity to the cache area. Furthermore, if the old compressed parity is not stored in the cache area, the disk I/O processing portion 902 reads out the old compressed parity from the HDD 16 prior to carrying out this process.

In S206, the disk I/O processing portion 902 writes the new data element and new P parity to the respective target HDDs 16 by sending to the respective target HDDs 16 new data element and new P parity write requests, which specify the target physical addresses.

In S207, the disk I/O processing portion 902 writes the new compressed parities to the respective target HDDs 16 by sending to the respective target HDDs 16 new compressed parity write requests, which specify the target physical addresses, and unlocks the stripes, which were locked in S203. Furthermore, the disk I/O processing portion 902, for example, can write all the post-update compressed parities written to the cache area to the HDDs 16 simultaneously at a prescribing timing without carrying out the processing of this S207.

In S208, the disk I/O processing portion 902 reads out the read-targeted data from the respective HDDs 16, and stores this read-out read-targeted data in the cache area.

Figure 16:
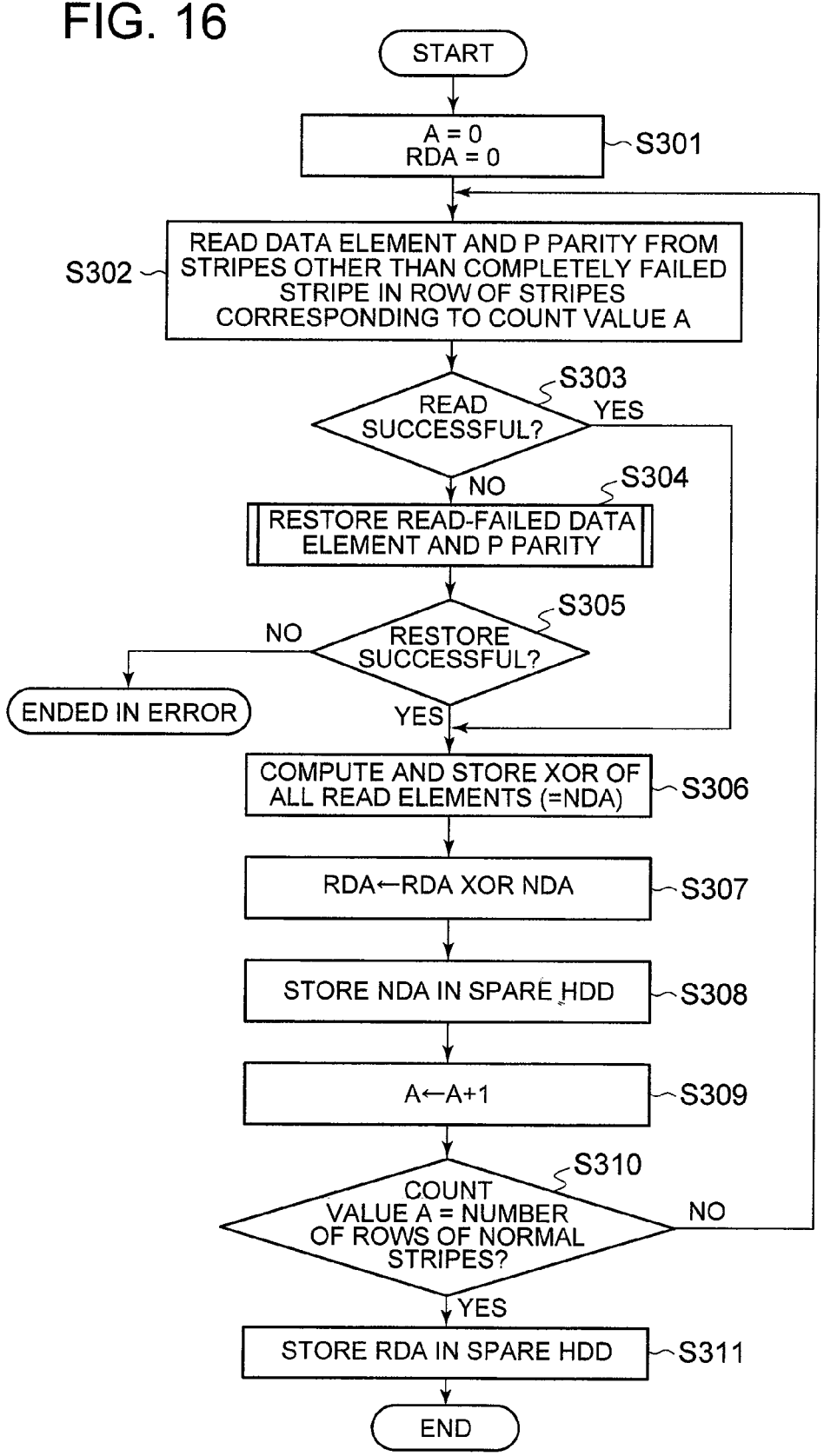
FIG. 16 is a flowchart of restore processing in the first data protection mode.

FIG. 16 is a flowchart of restore processing in the first data protection mode.

The disk I/O processing portion 902 carries out the restore processing. In the explanation of FIG. 16, it is supposed that there is one completely failed HDD in the RAID Group. In the FIG. 16 processing, the disk I/O processing portion 902 restores all the data element, P parity and compressed parity stripes in the completely failed HDD. Further, if either a data element or P parity read from the stripe of one other HDD fails at the time of this restore (that is, if there is at least one failed stripe besides the completely failed HDD), the disk I/O processing portion 902 moves to the processing of FIG. 17, and restores either the data element or P parity comprised in the HDD 16 other than the completely failed HDD 16.

The disk I/O processing portion 902 records in the cache/control memory 14 the count value (described as "count value A" hereinafter), which represents the rank-order number of a row of stripes from the top of the HDD, and the compressed parity (described as the "provisional compressed parity RD" hereinafter), which was continuously updated during this restore process.

In S301, the disk I/O processing portion 902 respectively sets the initialization values of count value A and the provisional compressed parity RD to 0.

In S302, the disk I/O processing portion 902 reads out the data elements and P parity (there may be the cases when no P parity is read) from all the stripes other than the failed stripe (hereinafter called "completely failed stripe") of the completely failed HDD in the row of stripes specified from the count value A (the $A^{th}$ stripe from the top). That is, the disk I/O processing portion 902 reads out the $A^{th}$ stripe from the top of an HDD 16 other than the completely failed HDD.

In S303, the disk I/O processing portion 902 determines whether or not the read in S302 was successful. When this read was successful (S303: YES), this processing moves to S306, and when this read failed (S303: NO), this processing proceeds to S304.

In S304, the disk I/O processing portion 902 restores the read-failed data element and/or P parity of the processing of S302. This process will be explained in detail below by referring to FIG. 17.

In S305, the disk I/O processing portion 902 determines whether or not the restore of S304 succeeded. When the restore was successful (S305: YES), this processing proceeds to S306, and when the restore failed (S305: NO), this processing ends.

In S306, the disk I/O processing portion 902 creates either the data element or P parity of the completely failed stripe corresponding to count value A from the data elements and P parity read out in S303 or restored in S304 by computing the exclusive OR thereof, and writes the created either data element or P parity (described as the "restoration element ND" hereinafter) to the cache area.

In S307, the disk I/O processing portion 902 calculates the exclusive OR of the provisional compressed parity RD and restoration element ND stored in the cache area, and makes the calculated value the provisional compressed parity RD. That is, the provisional compressed parity RD is updated to the most recent provisional compressed parity RD based on this restored restoration element ND.

In S308, the disk I/O processing portion 902 writes the restoration element ND to the stripe, which is in the same location in the spare HDD as the location of the target stripe in the completely failed HDD 16. Furthermore, the spare HDD is mounted in the storage system 1, and is the HDD which commences operation in place of the completely failed HDD 16 subsequent to this restore process ending normally, in other words, the HDD which becomes a member of the RAID Group in place of the completely failed HDD.

In S309, the disk I/O processing portion 902 adds 1 to the count value A.

In S310, the disk I/O processing portion 902 determines whether or not the post-update count value A in accordance with S309 is the same as the number of rows of normal stripes. When count value A constitutes the number of rows of normal stripes (S310: YES), this processing proceeds to S311, and when the count value A is less than the number of rows of normal stripes (S310: NO), this processing moves to S302. The fact that count value A is the number of rows of normal stripes signifies that all the normal stripes in the completely failed HDD have been restored. Moving to S311 means the provisional compressed parity RD becomes the compressed parity based on the data elements and P parities corresponding to all the normal stripes in the completely failed HDD.

In S311, the disk I/O processing portion 902 writes the provisional compressed parity RD (that is, the completed compressed parity) to the stripe, which is in the same location in the spare HDD 16 as the specific stripe in the completely failed HDD 16.

According to the above-described series of processes, all the data elements, P parities and compressed parities stored in the completely failed HDD are restored in a spare HDD.

Figure 17:
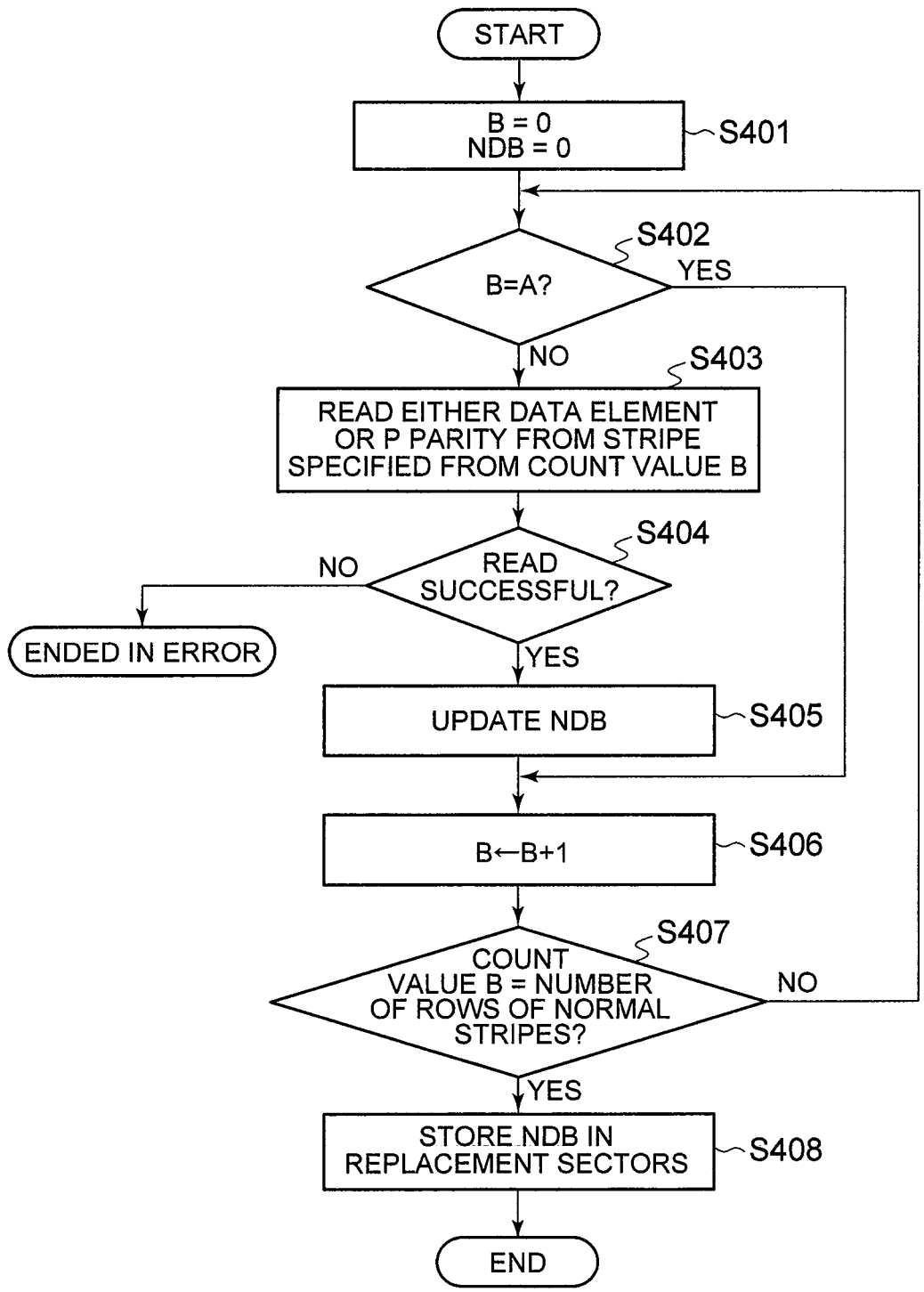
FIG. 17 is a flowchart of processing equivalent to that of S304 in FIG. 16.

FIG. 17 is a flowchart of processing equivalent to S304 in FIG. 16.

This processing is executed in S304 of FIG. 16. In this processing, the disk I/O processing portion 902 restores either a data element or P parity which failed to be read out in S303 of FIG. 16. This processing is carried out for an HDD 16 having a failed stripe, which stores either the data element or P parity that failed to be read out in S303 of FIG. 16, that is, for a partially failed HDD. In FIG. 17, since either the data element or P parity stored in this failed stripe in the partially failed HDD is the restore target, hereinafter, this failed stripe will be referred to as the "partially failed stripe".

First, the disk I/O processing portion 902 writes to the cache area a count value, which represents the rank-order number of a row of stripes from the top of the HDD (hereinafter, described as "count value B"), and a temporary value during calculation of either the data element or P parity stored in the partially failed stripe (hereinafter, described as the "provisional restoration element NDB").

In S401, the disk I/O processing portion 902 respectively sets 0 as the initialization value of count value B and provisional restoration element NDB.

In S402, the disk I/O processing portion 902 determines whether or not count value B is the same as count value A. When count value B and count value A are the same (S402: YES), this processing moves to S406, and when count value B and count value A are different (S402: NO), this processing proceeds to S403.

In S403, the disk I/O processing portion 902 reads out either the data element or the P parity from the stripe specified from count value B.

In S404, the disk I/O processing portion 902 determines whether or not the read of S403 was successful. When this read was successful (S404: YES), this processing proceeds to S405, and when this read failed (S404: NO), this processing ends in an error. Thus, when S305 of FIG. 16 becomes NO, the restore process ends in an error. That is, when two failed stripes exist in a partially failed HDD, a restore process in the first data protection mode ends in an error.

In S405, the disk I/O processing portion 902 calculates the exclusive OR of either the data element or P parity read in S403 and the provisional restoration element NDB already stored in the cache area, and makes this computed value the provisional restoration element NDB. That is, the provisional restoration element NDB is updated to the most recent value.

In S406, the disk I/O processing portion 902 adds 1 to the count value B.

In S407, the disk I/O processing portion 902 determines whether or not count value B and the number of rows of normal stripes are the same. When count value B is the same as the number of rows of normal stripes (S407: YES), this processing proceeds to S408, and when count value B differs from the number of rows of normal stripes (S407: NO), this processing moves to S402. When count value B is the same as the number of rows of normal stripes, the provisional restoration element NDB, which was created based on the data elements and P parity stored in all the normal stripes besides the one failed stripe in the partially failed HDD, constitutes either the data element or P parity stored in this failed stripe. In other words, either the data element or P parity stored in the failed stripe has been restored in the cache area.

In S408, the disk I/O processing portion 902 writes the provisional restoration element NDB, that is, either the data element or P parity stored in the failed stripe, which has been restored in the cache area, to the replacement sectors inside the partially failed HDD 16. The replacement sectors are reserved stripes provided in the HDD. Hereinafter, this reserved stripe can be used as the $A^{th}$ stripe in the relevant HDD in place of the failed stripe.

Figure 18:
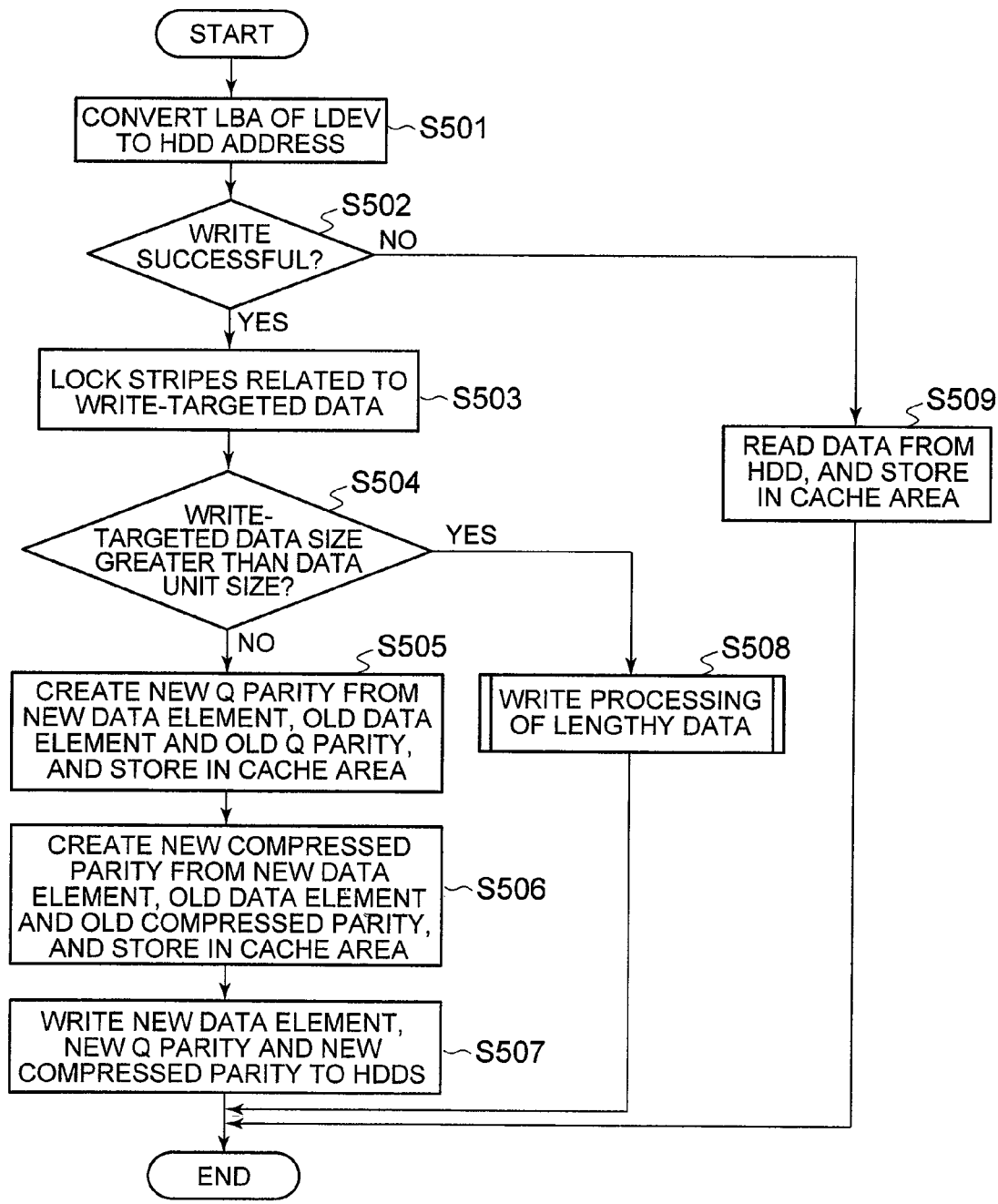
FIG. 18 is a flowchart of I/O processing based on the second data protection mode.

FIG. 18 is a flowchart of an I/O process based on the second data protection mode.

Figure 19:
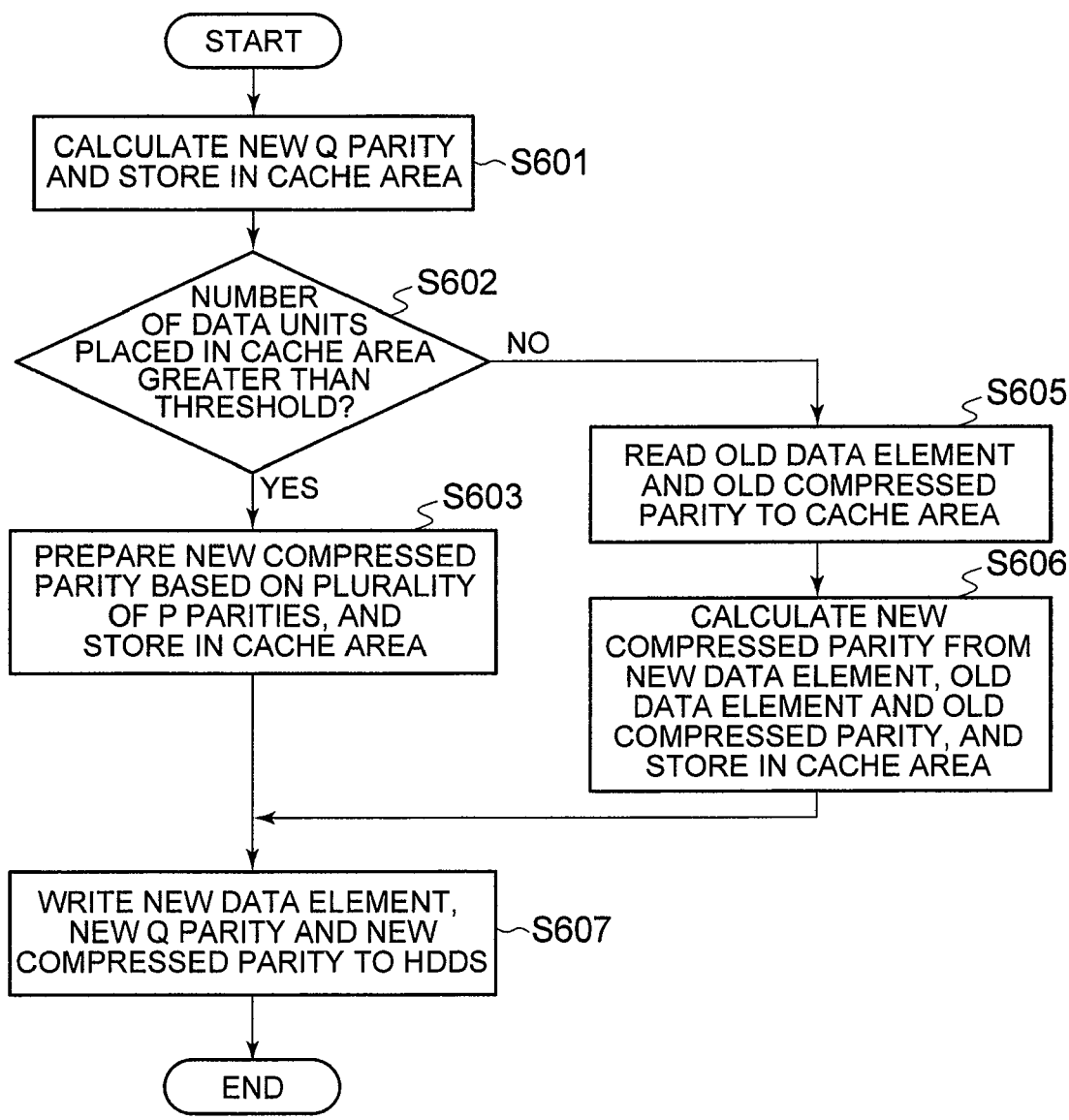
FIG. 19 is a flowchart of processing equivalent to that of S508 in FIG. 18.

Similar to the explanation of FIG. 15, in the explanations of FIGS. 18 and 19, the LDEV targeted by the I/O request will be referred to as the "target LDEV", the respective HDDs, which belong to the VDEV comprising the target LDEV, will be referred to as the "target HDD", and the address in the HDD to which the LDEV area specified by the LBA, which is specified in the I/O request from the host 4, is made correspondent, will be called the "target physical address".

The processing of S501 is the same processing as S201 of FIG. 15. That is, in S501, the LBA specified in the I/O request from the host 4 is converted to the target physical address.

In S502, similar to the processing of S202 of FIG. 15, the disk I/O processing portion 902 determines if the received I/O request is a write request or a read request. If the received I/O request is a write request (S502: YES), the processing proceeds to S503, and if the received I/O request is a read request (S502: NO), processing moves to S509.

In S503, the disk I/O processing portion 902 locks the stripes related to the write for the write-targeted data placed in the cache area (for example, the write-destination stripes of the data unit, into which the write-targeted data has been divided, and the Q parity and compressed parity corresponding thereto) so as to make these stripes inaccessible to other requests.

In S504, the disk I/O processing portion 902 determines whether or not the size of the write-targeted data is greater than the size of the data unit. When the size of the write-targeted data is smaller than the size of the data unit (S504: NO), this processing proceeds to S505, and when the size of the write-targeted data is the size of the data unit or larger (S504: YES), this processing moves to S508.

In S505, the disk I/O processing portion 902 creates a new Q parity from the new data element in the data unit, the old data element corresponding to this new data element, and the old Q parity, and writes this created new Q parity to the cache area. Furthermore, if the old data element or the old Q parity are not stored in the cache area, the disk I/O processing portion 902 reads the old data element or the old Q parity from the HDD 16 prior to carrying out this process.

In S506, the disk I/O processing portion 902 creates a new compressed parity from the new data element, old data element, and old compressed parity, and writes this created new compressed parity to the cache area. Furthermore, if the old compressed parity is not stored in the cache area, the disk I/O processing portion 902 reads the old compressed parity from the HDD 16 prior to carrying out this process.

In S507, the disk I/O processing portion 902 writes the new data element, the new Q parity and the new compressed parity to the respective target HDDs 16 by sending to the respective target HDDs 16 the new data element, new Q parity and new compressed parity write requests, which specify the target physical addresses.

In S508, the disk I/O processing portion 902 carries out write processing when the write-targeted data is greater than the data unit. This processing will be explained in detail hereinbelow by referring to FIG. 19.

In S509, similar to the processing of S208 of FIG. 15, the disk I/O processing portion 902 reads the read-targeted data from the respective target HDDs 16, and stores the read-out read-targeted data in the cache area.

FIG. 19 is a flowchart of processing equivalent to S508 of FIG. 18.

This processing is implemented in S508 of FIG. 18.

In S601, the disk I/O processing portion 902 uses the respective data units corresponding to the write-targeted data placed in the cache area to create a new Q parity, and writes this created new Q parity to the cache area. Furthermore, depending on the condition of the data unit (for example, when only one data element is updated), a new Q parity can also be created in accordance with processing similar to the processing of S505 of FIG. 18.

In S602, the disk I/O processing portion 902 determines whether or not the number of data units stored in the cache area is greater than a prescribed number (the number of data units corresponding to one compressed parity). When a prescribed number or more data units is placed in the cache area (S602: YES), this processing proceeds to S603, and when a prescribed number or more data units is not placed in the cache area (S602: NO), this processing moves to S605.

In S603, the disk I/O processing portion 902 creates a plurality of P parities corresponding to a plurality of data units stored in the cache area, creates a new compressed parity, which compresses the created plurality of P parities into one parity, and writes this new compressed parity to cache memory. Furthermore, if the number of data units cannot be divided by the number of data units corresponding to one compressed parity (when there is a remainder), the disk I/O processing portion 902 creates a new compressed parity via the processing shown in S605 and S606 for the surplus amount of data units. Or, a new compressed parity may also be created using an existing data unit or a data unit to be written anew in the future.

In S605, the disk I/O processing portion 902 reads the old data elements and the old compressed parity from the HDD 16.

In S606, similar to the processing of S506 of FIG. 18, the disk I/O processing portion 902 creates a new compressed parity from the new data element, old data element, and old compressed parity by computing the exclusive OR thereof, and writes this created new compressed parity to the cache area.

In S607, similar to the processing of S507 of FIG. 18, the disk I/O processing portion 902 writes the new data element, the new Q parity and the new compressed parity to the respective target HDDs 16 by sending to the respective target HDDs 16 the new data element, new Q parity and new compressed parity write requests, which specify the target physical addresses.

Figure 20:
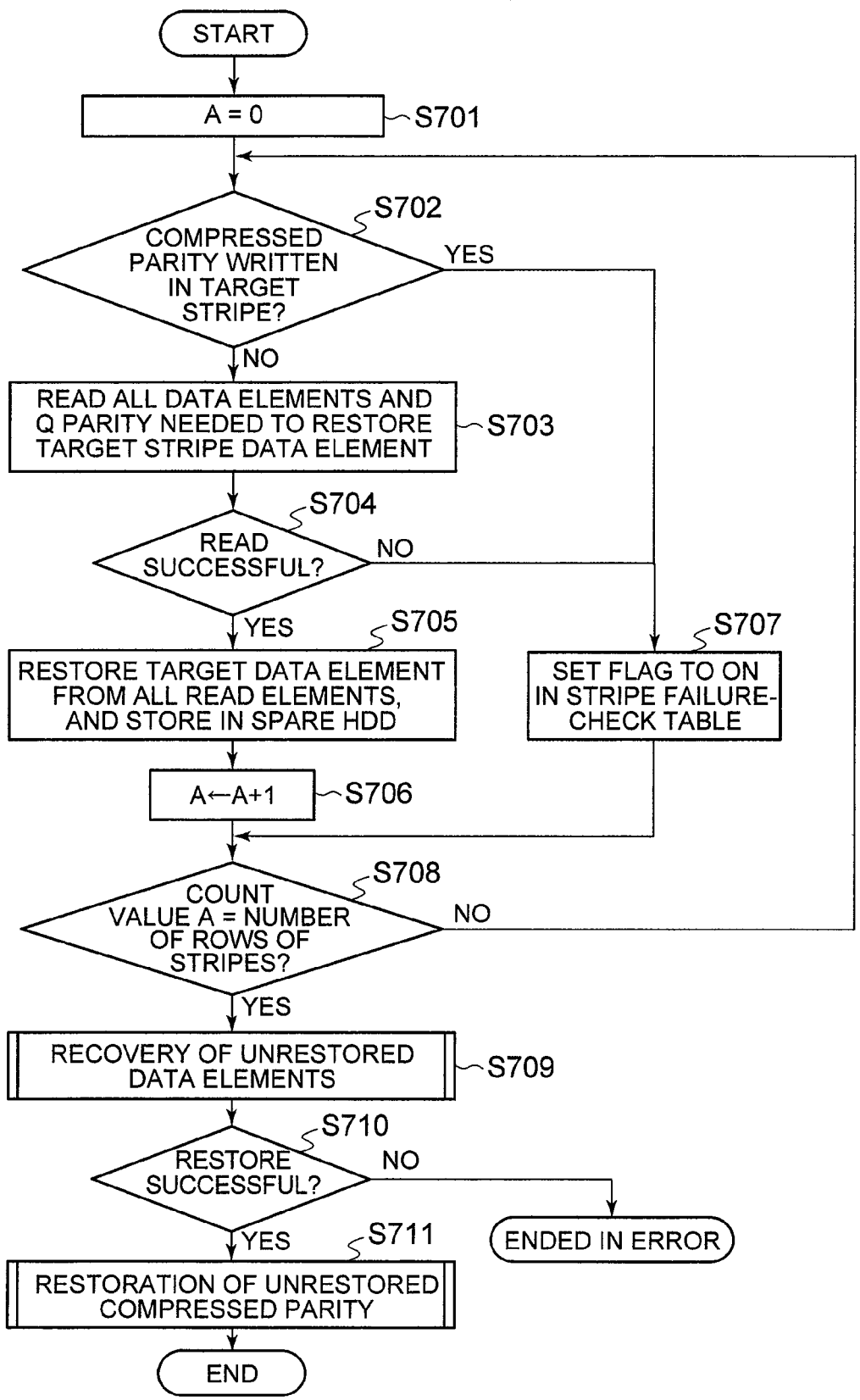
FIG. 20 is a flowchart of restore processing in the second data protection mode.

FIG. 20 is a flowchart of restore processing in the second data protection mode.

In the explanation of FIG. 20, similar to that of FIG. 16, it is supposed that there is one completely failed HDD in the RAID Group. In the processing of FIG. 20, the disk I/O processing portion 902 restores all the data elements, Q parities and compressed parities in the completely failed HDD.

The disk I/O processing portion 902 records the count value (described as "count value A" hereinafter), which represents the rank-order number of a row of stripes from the top of the HDD, in the cache/control memory 14.

In S701, the disk I/O processing portion 902 sets count value A to 0.

In S702, the disk I/O processing portion 902 determines whether or not the failed stripe of the completely failed HDD (hereinafter, the completely failed stripe), in the row of stripes specified from count value A, is the specific stripe in which a compressed parity is written. When the completely failed stripe corresponding to count value A is a specific stripe (S702: YES), this processing moves to S707. When the completely failed stripe corresponding to count value A is not a specific stripe (S702: NO), this processing proceeds to S703.

In S703, the disk I/O processing portion 902 reads the data elements and Q parity (there may also be the cases in which there is no Q parity) from all the stripes other than the completely failed stripe in the row of stripes specified from count value A.

In S704, the disk I/O processing portion 902 determines whether or not the read in S703 was successful. When this read was successful (S704: YES), this processing proceeds to S705, and when this read was not successful (S704: NO), this processing moves to S707.

In S705, the disk I/O processing portion 902 uses the data elements and Q parity read out in S703 to create either the data elements or Q parity of the completely failed stripe, and writes either these data elements or this Q parity to the stripe in the same location of the spare HDD 16 as the location of the completely failed stripe corresponding to count value A in the completely failed HDD 16.

In S706, the disk I/O processing portion 902 adds 1 to count value A.

In S707, when the determination in S702 is YES, the disk I/O processing portion 902 sets the column 802 flag, which corresponds to the completely failed stripe corresponding to count value A (specific stripe), to ON in the stripe failure-check table 800, and when the determination in S704 is NO, the disk I/O processing portion 902 sets the column 802 flag, which corresponds to the stripe in which either a data element or Q parity failed to be read out in S703 (for convenience sake, referred to as the "partially failed stripe" hereinafter) to ON in the stripe failure-check table 800.

In S708, the disk I/O processing portion 902 determines whether or not count value A has become equal to the number of rows of stripes inside the HDD. When count value A is equal to the number of rows of stripes in the HDD (S708: YES), this processing proceeds to S709, and when count value A is not equal to the number of rows of stripes in the HDD (S708: NO), this processing moves to S702.

In S709, the disk I/O processing portion 902 restores the data element and Q parity that have not yet to be restored, that is, the data element and Q parity stored in the stripes for which the flags in the stripe failure-check table 800 were turned ON in S707 to indicate failed (in other words, the data element and Q parity in the partially failed HDD). This processing will be described in detail later with reference to FIG. 21.

In S710, the disk I/O processing portion 902 determines whether or not the restoration of the restore-targeted data element and Q parity in S709 was successful. When the restore was successful (S710: YES), this processing proceeds to S711, and when the restore failed (S710: NO), this processing ends.

In S711, the disk I/O processing portion 902 restores all the compressed parities comprised in the failed HDDs 16.

Figure 21:
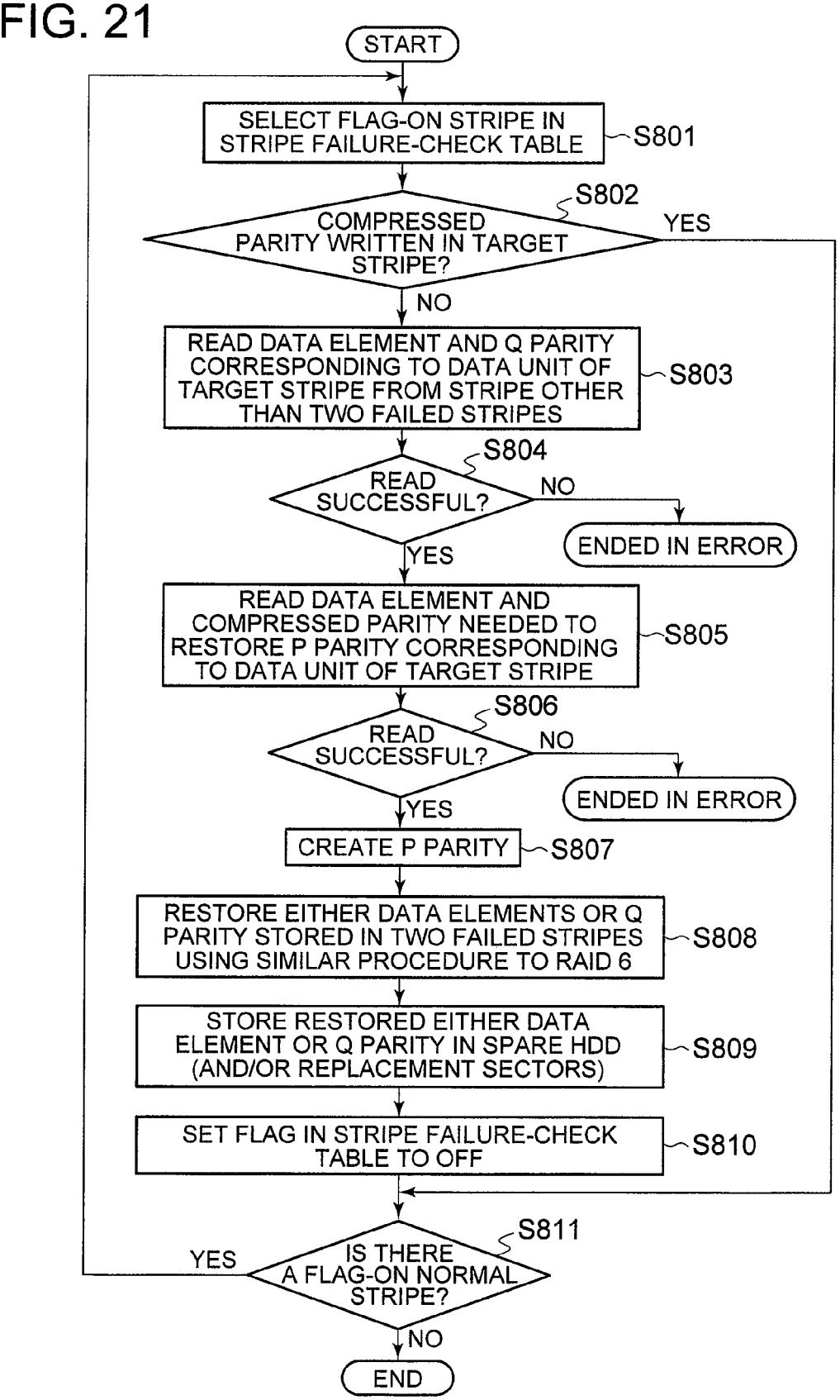
FIG. 21 is a flowchart of processing equivalent to that of S709 in FIG. 20.

FIG. 21 is a flowchart of processing equivalent to S709 of FIG. 20.

This processing is executed in S709 of FIG. 20.

In S801, the disk I/O processing portion 902 selects one stripe from among the stripes for which the column 802 flags were turned ON in the stripe failure-check table 800. This selected stripe becomes the target stripe of FIG. 21.

In S802, the disk I/O processing portion 902 determines whether or not the target stripe is the stripe in which the compressed parity is written. When the target stripe is the stripe in which the compressed parity is written (S802: YES), this processing moves to S811, and when the target stripe is not the stripe in which the compressed parity is written (S802: NO), this processing proceeds to S803.

In S803, the disk I/O processing portion 902 reads the data unit of the target stripe and the Q parity corresponding thereto from the stripe other than the two failed stripes. Thus, there are cases in which there is no Q parity even when the read is successful. Furthermore, the "data unit of the target stripe" is either the data unit comprising the data element stored in the target stripe, or the data unit corresponding to the Q parity stored in the target stripe. Further, the "two failed stripes" are the completely failed stripe and the partially failed stripe of the same data unit, and one of these failed stripes is the target stripe.

In S804, the disk I/O processing portion 902 determines whether or not the read in S803 was successful. When this read was successful (S804: YES), this processing proceeds to S805, and when this read failed (S804: NO), this processing ends.

In S805, the disk I/O processing portion 902 reads out all the data required for creating a P parity, which corresponds to the data unit of the target stripe (that is, the compressed parity to which this data unit corresponds, and all the other data units corresponding to this compressed parity).

In S806, the disk I/O processing portion 902 determines whether or not the read in S805 was successful. When this read was successful (S806: YES), this processing proceeds to S807, and when this read failed (S806: NO), this processing ends.

In S807, the disk I/O processing portion 902 creates a P parity, which corresponds to the data unit of the target stripe, from the data unit and compressed parity read out in S805, by computing the exclusive OR thereof.

In S808, the disk I/O processing portion 902 uses the data elements and/or Q parity read out in S803 and the P parity created in S807 to restore the data elements or Q parity in the two failed stripes via the same procedure as RAID 6.

In S809, the disk I/O processing portion 902 respectively writes either the data elements or Q parity restored in S808 to the stripe that is in the same location of the spare HDD 16 as the location of the completely failed stripe in the completely failed HDD 16, and to the stripe that is in the same location of the other spare HDD 16 as the location of the partially failed stripe in the partially failed HDD 16. Or, when either the data elements or Q parity restored in S808 were in the partially failed HDD 16, the write-destination of either the restored data elements or Q parity can be the replacement sectors of the partially failed HDD instead of the spare HDD.

In S810, the disk I/O processing portion 902 sets the two column 802 flags, which correspond to the two failed stripes comprising the target stripes, to OFF in the stripe failure-check table 800.

In S811, the disk I/O processing portion 902 determines if there is a normal stripe for which the column 802 flag is ON in the stripe failure-check table 800 (stripe in which a compressed parity is not written). When such a stripe exists (S811: YES), this processing moves to S801, and when such a stripe does not exist (S811: NO), this processing ends.

Figure 22:
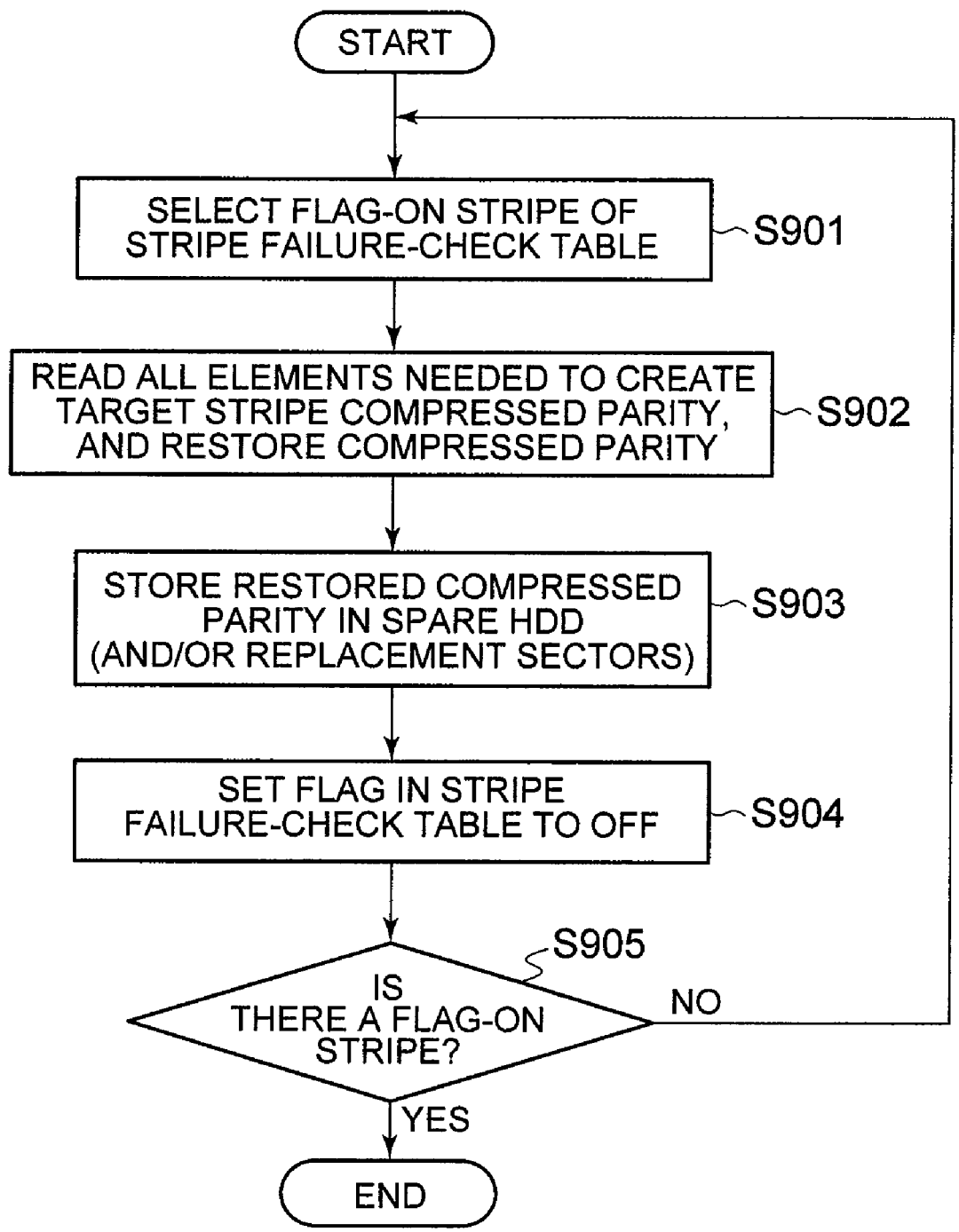
FIG. 22 is a flowchart of processing equivalent to that of S711 in FIG. 20.

FIG. 22 is a flowchart of processing equivalent to S711 of FIG. 20.

This processing is executed in S711 of FIG. 20.

In S901, similar to the processing of S801 of FIG. 21, the disk I/O processing portion 902 selects one stripe from among the stripes for which the column 802 flag is ON in the stripe failure-check table 800. This selected stripe (the target stripe of FIG. 22) is the stripe in which the compressed parity is written.

In S902, the disk I/O processing portion 902 reads from the HDD 16 all of the data units required for restoring the compressed parity stored in the target stripe, and restores the compressed parity by calculating XOR of these data units.

In S903, the disk I/O processing portion 902 writes the compressed parity restored in S902 to the stripe that is in the same location of the spare HDD 16 as the location of the target stripe in the completely failed HDD 16. Or, when the restored compressed parity is written to the partially failed HDD, the write-destination can be the replacement sector of the partially failed HDD instead of the spare HDD.

In S904, the disk I/O processing portion 902 sets the column 802 flag corresponding to the target stripe to OFF in the stripe failure-check table 800.

In S905, the disk I/O processing portion 902 determines if there is a stripe for which the column 802 flag is ON in the stripe failure-check table 800. When such a stripe exists (S905: YES), this processing moves to S901, and when there is no such stripe (S905: NO), this processing ends.

The above-described embodiments of the present invention are examples used to explain the present invention, and do not purport to limit the scope of the present invention solely to these embodiments. The present invention can be put into practice in a variety of other modes without departing from the gist thereof. For example, in the above-described examples, one stripe in a row of stripes corresponds one-to-one with an HDD, but two or more stripes in a row of stripes can correspond to one HDD. Further, in the second data protection mode, a P parity can be recorded for each data unit instead of a Q parity, and a plurality of Q parities can be compressed into a single compressed parity and written to the RAID Group instead of a plurality of P parities.

What is claimed is:

1. A storage system, comprising:
a storage group including a plurality of storage devices;
a write controller that divides write-targeted data into a plurality of data units, and writes to the storage group, wherein each of the plurality of data units includes data of a prescribed size; and
a restore controller that restores a data element, each of the plurality of data units including a plurality of data elements,
wherein a group storage area, which is a storage area of the storage group, includes a plurality of rows, each of the plurality of rows including a plurality of sub-storage areas,
wherein respective rows of the sub-storage areas span the plurality of storage devices, and each of the plurality of sub-storage areas of each respective row has a one-to-one correspondence with each of the plurality of storage devices,
wherein for a data unit of the plurality of data units, a size of the data unit is smaller than a size of one row of the sub-storage areas,
wherein the write controller:
(W1) creates a first redundant code based on the plurality of data elements, and respectively writes the plurality of data elements and the first redundant code to a different sub-storage area corresponding to a different storage device;
(W2) creates, based on at least two data elements and at least two first redundant codes, which are written to the plurality of sub-storage areas constituting the storage system, a compressed redundant code, which is a code having a size that is smaller than a total size of a plurality of first redundant codes; and
(W3) writes the compressed redundant code to a nonvolatile storage area;
as the (W1), creates a second redundant code based on the plurality of data elements constituting the data unit, and respectively writes the plurality of data elements and the second redundant code to the different sub-storage area corresponding to the different storage device;
as the (W2), for each plurality of data units written to the storage group, creates the plurality of first redundant codes respectively corresponding to the plurality of data units, and creates the compressed redundant code based on the plurality of first redundant codes; and
as the (W3), writes the respective compressed redundant codes corresponding to each plurality of data units written to the storage group, to the respective nonvolatile storage areas.

2. The storage system according to claim 1, wherein if multiple-failure data exists in the storage group, the multiple-failure data existing when a data unit comprises a first unreadable data element and a second unreadable data element, the restore controller:
- (R1) reads the compressed redundant code from the nonvolatile storage area of a partially failed storage device, reads a data element and a first redundant code from a prescribed range of readable sub-storage areas from the plurality of sub-storage areas constituting the partially failed storage device, and restores either the data element constituting the multiple-failure data or the first redundant code corresponding to the multiple-failure data, which is stored in an unreadable sub-storage area, based on the compressed redundant code, the data element, and the first redundant code;
- (R2) restores either the first unreadable data element constituting the multiple-failure data or the first redundant code corresponding to the multiple-failure data, which is stored in a sub-storage area of a completely failed storage device, based on either the restored first unreadable data element or the restored first redundant code, and either the second unreadable data element constituting the multiple-failure data or the first redundant code corresponding to the multiple-failure data;
- (R3) restores the data element of a single-failure data, which is a data unit that is not the multiple-failure data, based on another data element of the single-failure data, and the second redundant code corresponding to the single-failure data;
- as the (R1), creates a first redundant code based on the single-failure data having the restored data element, reads the compressed redundant code corresponding to the plurality of data units, one member of which is the single-failure data, and restores the first redundant code corresponding to the multiple-failure data based on the first redundant code corresponding to the single-failure data and the read-out compressed redundant code; and
- as the (R2), restores the first data element and the second data element of the multiple-failure data, based on the restored first redundant code corresponding to the multiple-failure data, the second redundant code corresponding to the multiple-failure data, and the another data element constituting the multiple-failure data.

3. The storage system according to claim 2, wherein the write controller:
- as the (W1), respectively writes the plurality of data elements to the different sub-storage area corresponding to the different storage device;
- as the (W2), creates, based on the plurality of first redundant codes, each of which is created based on the plurality of data units, the compressed redundant code; and
- as the (W3), writes the created compressed redundant code to the nonvolatile storage area, and wherein the restore controller:
- as the (R1), reads the compressed redundant code from the nonvolatile storage area, and uses the compressed redundant code to restore either the first unreadable data element of the multiple-failure data or the first redundant code, of the plurality of redundant codes, corresponding to the multiple-failure data; and
- as the (R2), restores the second unreadable data element of the multiple-failure data, based on either the restored first unreadable data element or the first redundant code, and either another data element of the multiple-failure data or the first redundant code corresponding to the multiple-failure data.

4. The storage system according to claim 3, further comprising:
- a cache memory for storing respective compressed redundant codes corresponding to respective storage devices,
- wherein, each time the write controller carries out the (W1), the write controller updates the respective compressed redundant codes stored in the cache memory in the (W2), and subsequent to updating the compressed redundant codes a plurality of times, writes post-update compressed redundant codes stored in the cache memory to the nonvolatile storage areas in the (W3).

5. The storage system according to claim 1, wherein for a plurality of data units corresponding to one compressed redundant code, between a first group of sub-storage areas in which a data unit is stored, and a second group of sub-storage areas, which is a plurality of sub-storage areas in which a subsequent data unit is stored, there is at least one different group of sub-storage areas in which is stored a data unit of a plurality of data units corresponding to at least one different compressed redundant code.

6. The storage system according to claim 5, wherein the number of different groups of sub-storage areas existing between the first group of sub-storage areas and the second group of sub-storage areas is a number based on storage media of respective storage devices constituting the storage group.

7. The storage system according to claim 1, wherein the compressed redundant code is written to a specific sub-storage area of a storage device that differs from the storage device for storing respective second redundant codes, which correspond to respective data units corresponding to the compressed redundant code.

8. The storage system according to claim 7, wherein one row of the plurality of sub-storage areas is larger in size than a total size of one data unit and one second redundant code.

9. A controller, which controls a storage group, the storage group including a plurality of storage devices, comprising:
- a processor;
- a write controller,
  - wherein the processor causes the write controller to divide write-targeted data into a plurality of data units, and write to the storage group,
  - wherein each of the plurality of data units includes data of a prescribed size; and
- a restore controller,
  - wherein the processor causes the restore controller to restore a data element, each of the plurality of data units including a plurality of data elements,
- wherein a group storage area, which is a storage area of the storage group, includes a plurality of rows, each of the plurality of rows including a plurality of sub-storage areas,
- wherein respective rows of the sub-storage areas span the plurality of storage devices, and each of the plurality of sub-storage areas of each respective row has a one-to-one correspondence with each of the plurality of storage devices,
- wherein for a data unit of the plurality of data units, a size of the data unit is smaller than a size of one row of the sub-storage areas,
- wherein the write controller:
  - (W1) creates a first redundant code based on the plurality of data elements, and respectively writes the plurality of data elements and the first redundant code to a different sub-storage area corresponding to a different storage device;

(W2) creates, based on at least two data elements and at least two first redundant codes, which are written to the plurality of sub-storage areas constituting the storage system, a compressed redundant code, which is a code having a size that is smaller than a total size of a plurality of first redundant codes; and (W3) writes the compressed redundant code to a nonvolatile storage area;

as the (W1), creates a second redundant code based on the plurality of data elements constituting the data unit, and respectively writes the plurality of data elements and the second redundant code to the different sub-storage area corresponding to the different storage device;

as the (W2), for each plurality of data units written to the storage group, creates the plurality of first redundant codes respectively corresponding to the plurality of data units, and creates the compressed redundant code based on the plurality of first redundant codes; and as the (W3), writes respective compressed redundant codes corresponding to each plurality of data units written to the storage group, to the respective nonvolatile storage areas.

10. The controller according to claim 9, wherein if multiple-failure data exists in the storage group, the multiple-failure data existing when a data unit comprises a first unreadable data element and a second unreadable data element, the restore controller:

(R1) reads the compressed redundant code from the nonvolatile storage area of a partially failed storage device, reads a data element and a first redundant code from a prescribed range of readable sub-storage areas from the plurality of sub-storage areas constituting the partially failed storage device, and restores either the data element constituting the multiple-failure data or the first redundant code corresponding to the multiple-failure data, which is stored in an unreadable sub-storage area, based on the compressed redundant code, the data element, and the first redundant code;

(R2) restores either the first unreadable data element constituting the multiple-failure data or the first redundant code corresponding to the multiple-failure data, which is stored in a sub-storage area of a completely failed storage device, based on either the restored first unreadable data element or the restored first redundant code, and either the second unreadable data element constituting the multiple-failure data or the first redundant code corresponding to the multiple-failure data;

(R3) restores the data element of a single-failure data, which is a data unit that is not the multiple-failure data, based on another data element of the single-failure data, and the second redundant code corresponding to the single-failure data;

as the (R1), creates a first redundant code based on the single-failure data having the restored data element, reads the compressed redundant code corresponding to the plurality of data units, one member of which is the single-failure data, and restores the first redundant code corresponding to the multiple-failure data based on the first redundant code corresponding to the single-failure data and the read-out compressed redundant code; and as the (R2), restores the first data element and the second data element of the multiple-failure data, based on the restored first redundant code corresponding to the multiple-failure data, the second redundant code corresponding to the multiple-failure data, and the another data element constituting the multiple-failure data.

11. The controller according to claim 10, wherein the write controller:

as the (W1), respectively writes the plurality of data elements to the different sub-storage area corresponding to the different storage device;

as the (W2), creates, based on the plurality of first redundant codes, each of which is created based on the plurality of data units, a compressed redundant code; and as the (W3), writes the created compressed redundant code to the nonvolatile storage area, and wherein the restore controller:

as the (R1), reads the compressed redundant code from the nonvolatile storage area, and uses the compressed redundant code to restore either the first unreadable data element of the multiple-failure data or a first redundant code, of the plurality, of redundant codes, corresponding to the multiple-failure data; and as the (R2), restores the second unreadable data element of the multiple-failure data, based on either the restored first unreadable data element or the first redundant code, and either another data element of the multiple-failure data or the first redundant code corresponding to the multiple-failure data.

12. A method for controlling input/output to/from a storage group including a plurality of storage devices, a group storage area, which is a storage area of the storage group, the group storage area including a plurality of rows, each of the plurality of rows including a plurality of sub-storage areas, and respective rows of the sub-storage areas spanning the plurality of storage devices, and each of the plurality of sub-storage areas of each respective row has a one-to-one correspondence with each of the plurality of storage devices, the method comprising the steps of:

(W1) creating a first redundant code based on the plurality of data elements, and respectively writing the plurality of data elements and the first redundant code to a different sub-storage area corresponding to a different storage device;

(W2) creating, based on at least two data elements and at least two first redundant codes, which are written to the plurality of sub-storage areas constituting the storage system, a compressed redundant code, which is a code having a size that is smaller than a total size of a plurality of first redundant codes; and (W3) writing the compressed redundant code to a nonvolatile storage area;

as the (W1), creating a second redundant code based on the plurality of data elements constituting the data unit, and respectively writing the plurality of data elements and the second redundant code to the different sub-storage area corresponding to the different storage device;

as the (W2), for each plurality of data units written to the storage group, creating the plurality of first redundant codes respectively corresponding to the plurality of data units, and creating the compressed redundant code based on the plurality of first redundant codes; and as the (W3), writing the respective compressed redundant codes corresponding to each plurality of data units written to the storage group, to the respective nonvolatile storage areas.

13. The method according to claim 12, wherein if multiple-failure data exists in the storage group, the multiple-failure data existing when a data unit comprises a first unreadable data element and a second unreadable data element, the method further comprises:

(R1) reading the compressed redundant code from the nonvolatile storage area of a partially failed storage device, reads a data element and a first redundant code from a prescribed range of readable sub-storage areas from the plurality of sub-storage areas constituting the partially failed storage device, and restoring either the data element constituting the multiple-failure data or the first redundant code corresponding to the multiple-failure data, which is stored in an unreadable sub-storage area, based on the compressed redundant code, the data element, and the first redundant code;

(R2) restores either the first unreadable data element constituting the multiple-failure data or the first redundant code corresponding to the multiple-failure data, which is stored in a sub-storage area of a completely failed storage device, based on either the restored first unreadable data element or the restored first redundant code, and either the second unreadable data element constituting the multiple-failure data or the first redundant code corresponding to the multiple-failure data;

(R3) restoring the data element of a single-failure data, which is a data unit that is not the multiple-failure data, based on another data element of the single-failure data, and the second redundant code corresponding to the single-failure data;

as the (R1), creating a first redundant code based on the single-failure data having the restored data element, reads the compressed redundant code corresponding to the plurality of data units, one member of which is the single-failure data, and restoring the first redundant code corresponding to the multiple-failure data based on the first redundant code corresponding to the single-failure data and the read-out compressed redundant code; and as the (R2), restoring the first data element and the second data element of the multiple-failure data, based on the restored first redundant code corresponding to the multiple-failure data, the second redundant code corresponding to the multiple-failure data, and the another data element constituting the multiple-failure data.

14. The method according to claim 13, further comprising the steps of:

as the (W1), respectively writing a plurality of data elements of a data unit of the plurality of data units, to the different sub-storage area corresponding to the different storage device, wherein a size of the data unit is smaller than a size of one row of the sub-storage areas;

as the (W2), creating, based on the plurality of first redundant codes, each of which is created based on the plurality of data units, the compressed redundant code; and as the (W3), writing the created compressed redundant code to the nonvolatile storage area;

as the (R1), reading the compressed redundant code, and using the compressed redundant code to restore either the first unreadable data element of the multiple-failure data or a first redundant code, of the plurality of redundant codes, corresponding to the multiple-failure data; and as the (R2), restoring the second unreadable data element of the multiple-failure data, based on either the restored first unreadable data element or the first redundant code, and either another data element of the multiple-failure data or the first redundant code corresponding to the multiple-failure data.

* * * * *